US012493457B2

(12) United States Patent
Adogla et al.

(10) Patent No.: US 12,493,457 B2
(45) Date of Patent: Dec. 9, 2025

(54) MOBILE PREFAB FACTORY FOR BUILDING CLOUD REGIONS

(71) Applicant: Oracle International Corporation, Redwood Shores, CA (US)

(72) Inventors: Eden Adogla, Seattle, WA (US); Thomas Werner Kuehnel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 18/122,677

(22) Filed: Mar. 16, 2023

(65) Prior Publication Data
US 2024/0311122 A1    Sep. 19, 2024

(51) Int. Cl.
*G06F 8/65* (2018.01)
(52) U.S. Cl.
CPC ..................... *G06F 8/65* (2013.01)
(58) Field of Classification Search
None
See application file for complete search history.

(56) References Cited

U.S. PATENT DOCUMENTS

| | | | |
|---|---|---|---|
| 7,278,273 B1 | 10/2007 | Whitted et al. | |
| 7,724,513 B2 | 5/2010 | Coglitore et al. | |
| 8,137,003 B2 | 3/2012 | Shannon et al. | |
| 8,143,521 B2 | 3/2012 | Burek et al. | |
| 8,737,090 B2 | 5/2014 | Jai | |
| 8,943,757 B2 | 2/2015 | Parizeau et al. | |
| 9,176,744 B2 * | 11/2015 | Lee | G06F 8/658 |
| 9,385,918 B2 * | 7/2016 | Civilini | H04L 41/0869 |

(Continued)

FOREIGN PATENT DOCUMENTS

| | | |
|---|---|---|
| CN | 105227686 A | 1/2016 |
| CN | 106535548 A | 3/2017 |

(Continued)

OTHER PUBLICATIONS

International Application No. PCT/US2024/020248, International Search Report and Written Opinion mailed on Jul. 5, 2024, 12 pages.

(Continued)

*Primary Examiner* — Ryan D. Coyer
(74) *Attorney, Agent, or Firm* — Kilpatrick Townsend & Stockton LLP

(57) ABSTRACT

Techniques are disclosed for a mobile prefab factory for building region data centers. The mobile prefab factory can include a containment enclosure configured to mount physical computing resources of a data center, a networking device, a power supply electrically connected to the networking device, and a plurality of computing devices of the physical computing resources communicatively connected to the networking device and electrically connected to the power supply. A manager service can configure the computing devices for transmission to the destination site by implementing a seed server device of the plurality of computing devices and implementing a software resource repository at the seed server device. While the containment enclosure is in transit, the seed server device can deploy software resources to the plurality of computing devices.

20 Claims, 17 Drawing Sheets

(56) References Cited

U.S. PATENT DOCUMENTS

| | | | |
|---|---|---|---|
| 9,584,373 B2 | 2/2017 | Schlansker et al. | |
| 9,603,281 B2 | 3/2017 | Crosby, Jr. | |
| 9,813,302 B2 | 11/2017 | Curtis et al. | |
| 10,420,248 B1 | 9/2019 | Yu et al. | |
| 10,674,625 B1 | 6/2020 | Leung et al. | |
| 10,965,525 B1 | 3/2021 | Frink et al. | |
| 11,006,001 B1 | 5/2021 | Britt et al. | |
| 11,316,822 B1 | 4/2022 | Gawade et al. | |
| 11,496,364 B1 | 11/2022 | Mellquist et al. | |
| 2008/0314979 A1 | 12/2008 | Johnsen et al. | |
| 2009/0198388 A1 | 8/2009 | Hillis | |
| 2009/0216920 A1 | 8/2009 | Lauterbach et al. | |
| 2012/0110055 A1 | 5/2012 | Van Biljon et al. | |
| 2012/0155027 A1 | 6/2012 | Broome et al. | |
| 2014/0314099 A1 | 10/2014 | Dress | |
| 2019/0208290 A1 | 7/2019 | Olson et al. | |
| 2019/0213044 A1* | 7/2019 | Cui | G06F 9/5072 |
| 2019/0235851 A1* | 8/2019 | Vergara | G06F 8/65 |
| 2020/0205310 A1 | 6/2020 | Rogers | |
| 2021/0392041 A1 | 12/2021 | Ranjan et al. | |
| 2022/0029794 A1 | 1/2022 | Malhotra et al. | |
| 2022/0191163 A1 | 6/2022 | Loefstrand et al. | |
| 2022/0217057 A1 | 7/2022 | Schumaker | |
| 2023/0018535 A1* | 1/2023 | Chawla | G06F 9/5027 |
| 2023/0153094 A1* | 5/2023 | Cain, Jr. | H04L 67/06 717/168 |
| 2024/0015136 A1* | 1/2024 | Asveren | H04L 65/1059 |

FOREIGN PATENT DOCUMENTS

| | | |
|---|---|---|
| CN | 112188788 A | 1/2021 |
| CN | 113873053 A | 12/2021 |
| CN | 215526574 U | 1/2022 |
| EP | 3275143 B1 | 12/2019 |
| WO | 2019191401 A1 | 10/2019 |
| WO | 2020018582 A1 | 1/2020 |

OTHER PUBLICATIONS

International Application No. PCT/US2024/020250, International Search Report and Written Opinion mailed on Jun. 26, 2024, 12 pages.
International Application No. PCT/US2024/020255, International Search Report and Written Opinion mailed on Jul. 3, 2024, 12 pages.
International Application No. PCT/US2024/020258, International Search Report and Written Opinion mailed on Aug. 26, 2024, 16 pages.
International Application No. PCT/US2024/020258, Invitation to Pay Additional Fees and, Where Applicable, Protest Fee mailed on Jul. 3, 2024, 8 pages.
International Application No. PCT/US2024/020261, International Search Report and Written Opinion mailed on Jul. 3, 2024, 11 pages.
International Application No. PCT/US2024/035410, International Search Report and Written Opinion mailed on Oct. 7, 2024, 23 pages.
7220 Interconnect Router for Data Center Fabric, Nokia, Available Online at: https://www.nokia.com/networks/data-center/data-center-fabric/7220-interconnect-router/, Accessed from Internet on May 20, 2022, 3 pages.
90 kW, Tier II, Direct Expansion, 142.1 m2 , All-In-One Prefab Data Center Module—Busway or PDU, Schneider Electric, Available Online at: https://download.schneider-electric.com/files?p_Doc_Ref=RD84DSR2_EN, Sep. 2018, pp. 1-7.
Adding or Changing Name Servers and Glue Records for a Domain, Available online at: https://docs.aws.amazon.com/Route53/latest/DeveloperGuide/domain-name-servers-glue-records.html, Accessed from Internet May 2, 2022, 5 pages.
All-in-One Container, Schneider Electric India, Available Online at: https://www.se.com/in/en/product-range/62320-allinone-container/?parent-subcategory-id=7570#overview, Accessed from Internet on May 3, 2022, 3 pages.
Cable and Pipe Seals for Data Centers, Roxtec, Available Online at: https://www.roxtec.com/uk/industries/infrastructure/data-centers/, Accessed from Internet on May 20, 2022, 14 pages.
Cable Management for Data Centres, Etech Components, Available Online at: https://etechcomponents.com/cable-management-for-data-centres/, Dec. 10, 2021, 8 pages.
Cable Trough System, Etech Components, Available Online at: https://etechcomponents.com/product_categories/cable-trough-system/?cn-reloaded=1, Accessed from Internet on May 20, 2022, 8 pages.
Cisco ACI Multi-Site Architecture: White Paper, Available Online at: https://www.cisco.com/c/en/us/solutions/collateral/data-center-virtualization/application-centric-infrastructure/white-paper-c11-739609.html, 2021, pp. 1-140.
Cisco UCS 6400 Series Fabric Interconnects, Data Sheet, Cisco Public, Available Online at: https://www.cisco.com/c/en/us/products/collateral/servers-unified-computing/datasheet-c78-741116.html, Accessed from Internet on May 3, 2022, 5 pages.
Cisco UCS Fabric Interconnects and Fabric Extenders, Cisco, Available Online at: https://www.cisco.com/c/en/us/products/servers-unified-computing/fabric-interconnects.html, Accessed from Internet on May 3, 2022, 2 pages.
Configure a Custom Domain Name for your Azure API Management Instance, Available online at: https://docs.microsoft.com/en-us/azure/api-management/configure-custom-domain?tabs=custom, Apr. 28, 2022, 8 pages.
Configuring DNS Server Settings for a Data Center, Available online at: https://sort.veritas.com/public/documents/ITRP/1.0/windowsandunix/productguides/html/deployment/ch06s07s01.htm, Accessed from Internet May 2, 2022, 2 pages.
Creating an Edge-Optimized Custom Domain Name, Available online at: https://docs.aws.amazon.com/apigateway/latest/developerguide/how-to-edge-optimized-custom-domain-name.html, Accessed from Internet May 2, 2022, 7 pages.
Data Center Manager, Honeywell Building Technologies, Available Online at: https://buildings.honeywell.com/us/en/industries/data-centers/honeywell_data_center_manager, Accessed from Internet on May 20, 2022, 5 pages.
Data Center Solutions and Networks Schneider Electric India, Available Online at: https://www.se.com/in/en/work/solutions/for-business/data-centers-and-networks/, Accessed from Interneton May 20, 2022, 7 pages.
Data Centers, Honeywell Building Technologies, Available Online at: https://buildings.honeywell.com/us/en/industries/data-centers, Accessed from Internet on May 20, 2022, 5 pages.
Data Centers: Our Controls, Aws, Available Online at: https://aws.amazon.com/compliance/data-center/controls/, Accessed from Internet on May 20, 2022, pp. 1-8.
EcoStruxure Data Center Reference Designs, Schneider Electric Global, Available Online at: https://www.se.com/ww/en/work/solutions/for-business/data-centers-and-networks/reference-designs/, Accessed from Internet on May 20, 2022, pp. 1-5.
EcoStruxure Data Centre Solutions, Schneider Electric India, Available Online at: https://www.se.com/in/en/work/products/master-ranges/ecostruxure-data-center-solutions/, Accessed from Internet on May 20, 2022, pp. 1-6.
EcoStruxure IT, Schneider Electric, Available Online at: https://ecostruxureit.com/, Accessed from Internet on May 20, 2022, 4 pages.
FusionDC1000A Prefabricated All-In-One Data Center, Huawei Enterprise, Available Online at: https://e.huawei.com/in/products/network-energy/dc-facilities/ids1000-a, Accessed from Internet on May 20, 2022, 6 pages.
FusionDC1000B Prefabricated Modular Data Center (Small- and Medium-Sized), Huawei Enterprise, Available Online at: https://e.huawei.com/in/products/network-energy/dc-facilities/ids1000-b, Accessed from Internet on May 5, 2022, pp. 1-5.
Hybrid Cloud Data Center, IBM, Available Online at: https://www.ibm.com/za-en/services/business-continuity/data-center, Accessed from Internet on May 20, 2022, pp. 1-7.

(56) References Cited

OTHER PUBLICATIONS

IBM Cloud Foundry Migration Runtime UI SSL Certificate Update and Rotation, Available online at: https://www.ibm.com/docs/en/cfmr?topic=guide-ssl-certificate-update-rotation, Sep. 17, 2021, 2 pages.
IManager NetEco6000 DCIM+ Solution, Huawei Enterprise, Available Online at: https://e.huawei.com/in/products/network-energy/dc-facilities/neteco6000, Accessed from Internet on May 5, 2022, 3 pages.
Introducing the Microsoft Azure Modular Datacenter, Available Online at: https://azure.microsoft.com/en-in/blog/introducing-the-microsoft-azure-modular-datacenter/, Oct. 20, 2020, 6 pages.
Is It Possible to Have One SSL Certificate for Multiple Domains, Available online At: https://sectigostore.com/page/one-ssl-certificate-for-multiple-domains/, Accessed from Internet May 2, 2022, 7 pages.
ManageOne Data Center Management, Available Online at: https://carrier.huawei.com/en/products/IT/cloud-computing/manageone, Accessed from Internet on May 20, 2022, pp. 1-3.
Managing Google EKM Endpoints, Available online at: https://thalesdocs.com/ctp/cm/2.7/admin/cckm_ag/ekm/managing_ekm_endpoints/index.html, Accessed from Internet May 2, 2022, 12 pages.
Mobile Data Center, CONTEG, Available Online at: https://www.conteg.com/mobile-data-center, Accessed from Internet on May 20, 2022, 4 pages.
Modular Data Centers for Efficient Operations, Schneider Electric Indian, Available Online at: https://www.se.com/in/en/work/solutions/for-business/data-centers-and-networks/modular/, Accessed from Internet on May 20, 2022, pp. 1-8.
Modular Datacenter Overview, Available Online at: https://docs.microsoft.com/en-us/azure-stack/mdc/mdc-overview, Mar. 1, 2022, 4 pages.
Multiple SSL Certificates for a Single Domain on Different Servers, Server Fault, Available online at: https://serverfault.com/questions/525581/multiple-ssl-certificates-for-a-single-domain-on-different-servers, Accessed from Internet May 2, 2022, 3 pages.
Next-Generation Data Center Interconnect Powered by the Pluribus Adaptive Cloud Fabric, Pluribus Networks, Available Online at: https://i.dell.com/sites/csdocuments/Product_Docs/en/dell-pluribus-nextgen-dci-so-042518.pdf, Accessed from Internet on May 20, 2022, pp. 1-5.
Prefabricated Data Center, Vertiv, Available Online at: https://www.vertiv.com/en-asia/solutions/prefabricated-data-center/, Accessed from Internet on May 20, 2022, pp. 1-8.
Prefabricated Data Center Brochure, Available Online at: https://www.vertiv.com/4994d7/globalassets/shared/vertiv-prefabricated-data-center-brochure.pdf, Accessed from Internet on May 20, 2022, 12 pages.
Prefabricated Data Center: Integral Systems Test Service for IT Module, Schneider Electric Services, Available Online at: https://www.se.com/in/en/download/document/SPD_SSAO-A3VLV3_EN, Oct. 16, 2017, 2 pages.
Prefabricated Modular & Mobile Data Centre, Available Online at: https://www.mobiledatacentre.com/prefabrication-construction-applications/mobile-data-centre/, Accessed from Internet on May 20, 2022, 5 pages.
Prefabricated Modular Data Center—Add Data Center Capacity Where and When You Need It, IBM Global Technology Services, Available Online at: https://www.ibm.com/downloads/cas/YXKNDQAO, Sep. 2014, 12 pages.
Ramos Plus, CONTEG, Available Online at: https://www.conteg.com/products/ramos-plus, Accessed from Internet on May 20, 2022, 15 pages.
Redirecting Old Domain to New Domain—Google SSL Warning, Available online at: https://webmasters.stackexchange.com/questions/133635/redirecting-old-domain-to-new-domain-google-ssl-warning, Accessed from Internet May 2, 2022, 3 pages.
Schneider 3D Pre Fab Structure Tour, Available Online at: https://apps.kaonadn.net/6819002/SchneiderPrefab/index.html, Accessed from Internet on May 20, 2022, 1 page.
Schneider Electric EcoStruxure TM Modular Data Centers, Schneider Electric, Available Online at: https://download.schneider-electric.com/files?p_enDocType=Catalog&p_File_Name=EcoStruxure+Modular+Data+Centers+Brochure+ROW+Rev+4.pdf&p_Doc_Ref=Modular_Overview_Catalog_EN, Accessed from Internet on May 20, 2022, 2 pages.
Transform Maintenance into Uptime Strategy, Available Online at: https://buildings.honeywell.com/content/dam/hbtbt/en/documents/downloads/HW-BR-DigitizedMaintenance.pdf, 2021, 4 pages.
Transforming Data Centers into Open Interconnection Fabrics, DataCenter News, Available Online at: https://datacenternews.asia/story/transforming-data-centers-open-interconnection-fabrics, Mar. 10, 2017, pp. 1-3.
What is a Data Center Fabric?, Juniper Networks, Available Online at: https://www.juniper.net/us/en/research-topics/what-is-data-center-fabric.html, Accessed from Internet on May 3, 2022, 4 pages.
Your Data Center Your Rules, Honeywell Data Center Manager, Available Online at: https://buildings.honeywell.com/content/dam/hbtbt/en/documents/downloads/Honeywell-Data-Center-Manager-BR.pdf, 2021, 4 pages.
Andreyev, Introducing Data Center Fabric, the Next-Generation Facebook Data Center Network, Data Center Engineering, Networking & Traffic, Production Engineering, Available Online at: https://engineering.fb.com/2014/11/14/production-engineering/introducing-data-center-fabric-the-next-generation-facebook-data-center-network/, Nov. 14, 2014, 10 pages.
Andreyev et al., Reinventing Facebook's Data Center Network, Data Center Engineering, Networking & Traffic, Available Online at: https://engineering.fb.com/2019/03/14/data-center-engineering/f16-minipack/, Mar. 14, 2019, 18 pages.
Dementyev et al., Zero Downtime Rebranding—Martian Chronicles, Evil Martians' Team blog, Available Online at: https://evilmartians.com/chronicles/zero-downtime-rebranding, Nov. 27, 2017, 14 pages.
Gao et al., DRAF: A Low-Power DRAM-Based Reconfigurable Acceleration Fabric, ACM SIGARCH Computer Architecture News, vol. 44, No. 3, Available Online at: https://dl.acm.org/doi/pdf/10.1145/3007787.3001191, Jun. 18, 2016, pp. 506-518.
Yirka, Microsoft Debuts Portable Data Center to Bring Cloud Computing to Remote Environments, TechXplore, Available Online at: https://techxplore.com/pdf522492993.pdf, Oct. 21, 2020, 2 pages.

* cited by examiner

MOBILE PREFAB FACTORY FOR BUILDING CLOUD REGIONS

CROSS REFERENCES TO RELATED APPLICATIONS

The present application is related to the following applications, the entire contents of which are incorporated herein by reference for all purposes:
(1) U.S. Non-Provisional application Ser. No. 18/122,674, filed on the same day, entitled "TECHNIQUES FOR BUILDING CLOUD REGIONS AT A PREFAB FACTORY";
(2) U.S. Non-Provisional application Ser. No. 18/122,676, filed on the same day, entitled "STATIC NETWORK FABRIC AT A PREFAB FACTORY";
(3) U.S. Non-Provisional application Ser. No. 18/122,678, filed on the same day, entitled "TECHNIQUES FOR A CABLE TERMINATION PROTECTION APPARATUS IN A PREFAB FACTORY"; and
(4) U.S. Non-Provisional application Ser. No. 18/122,675, filed on the same day, entitled "TECHNIQUES FOR VALIDATING CLOUD REGIONS BUILT AT A PREFAB FACTORY".

BACKGROUND

A cloud infrastructure provider may operate one or more data centers in geographic areas around the world. A "region" is a logical abstraction around a collection of the computing, storage, and networking resources of the data centers of a given geographical area that are used to provide the cloud computing infrastructure. Building new regions can include provisioning the computing resources, configuring infrastructure, and deploying code to those resources, typically over network connections to the data centers. However, building regions with physical resources located at the final destination data center sites requires significant preparation work at the data centers that can complicate the logistics and scheduling of completing the building of a region.

BRIEF SUMMARY

Embodiments of the present disclosure relate to automatically building a region using a prefab factory. A prefab factory may be a facility dedicated to configuring computing devices, networking devices, and other physical resources for delivery to a destination site (e.g., a destination region—one or more data centers in a geographic area, a customer facility, etc.). Operations for building a region can include bootstrapping (e.g., provisioning and/or deploying) resources (e.g., infrastructure components, artifacts, etc.) for any suitable number of services available from the region when delivered to the destination. Once the physical resources have been configured at the prefab factory, they may be shipped to the destination site, installed at the destination data center, and have final configurations and other software resources deployed to the physical resources. Resources used for bootstrapping (e.g., software artifacts, software images, etc.) may be provided in a bootstrapping environment in an existing region (e.g., one or more data centers of a host region) or on computing devices. Building the region may be orchestrated by one or more services that can manage the inventory of physical computing devices used to build regions in the mobile prefab factory, generate and specify the configurations of regions to be built in the prefab factory, manage the bootstrapping of the regions, configure the regions for transmission to a destination site, and test and verify the physical resources after the physical resources have been installed at the destination site. A prefab region may be built to meet a specific customer's configuration preferences (built-to-order) or built to a common specification that may be further customized during installation at a specific customer's site (built-to-stock).

One embodiment is directed to a mobile prefab factory that can support the operations described above for building a region while the computing devices for the region are in transit to a destination site. The mobile prefab factory can be a system that includes a containment enclosure (e.g., a shipping container, a semi-trailer, an aircraft fuselage) that is configured to mount physical computing resources (e.g., server racks, networking equipment, etc.), a power supply, and a plurality of computing devices of the physical computing resources. The computing devices can be communicatively connected to a networking device and electrically connected to the power supply. The computing devices can include a seed server, which may be a server device configured to host a bootstrapping environment and instances of prefab services that can orchestrate the deployment of software resources from the server device to the other computing devices while the containment enclosure is transmitted to a destination site.

Another embodiment is directed to a method to deploy software resources to computing devices in the mobile prefab factory. The method can be performed by a manager service executing in a computing environment, which can be a cloud-computing environment of an existing region (e.g., a second data center). The method can include configuring the computing devices for transmission by implementing a seed server at a computing device of the computing devices and implementing a software resource repository at the seed server. The software resource repository can include software resources associated with one or more cloud services that can execute on the computing devices after the completion of the region build operations. While the mobile prefab factory is en route to the destination site, the seed server can deploy a portion of the software resources to the computing device.

Still another embodiment is directed to a computing system that includes one or more processors and one or more memories storing computer-readable instructions that, when executed by the one or more processors, cause the computing system to perform the method described above.

BRIEF DESCRIPTION OF DRAWINGS

To easily identify the discussion of any particular element or act, the most significant digit or digits in a reference number refer to the figure number in which that element is first introduced.

DETAILED DESCRIPTION OF DRAWINGS

Figure 1:
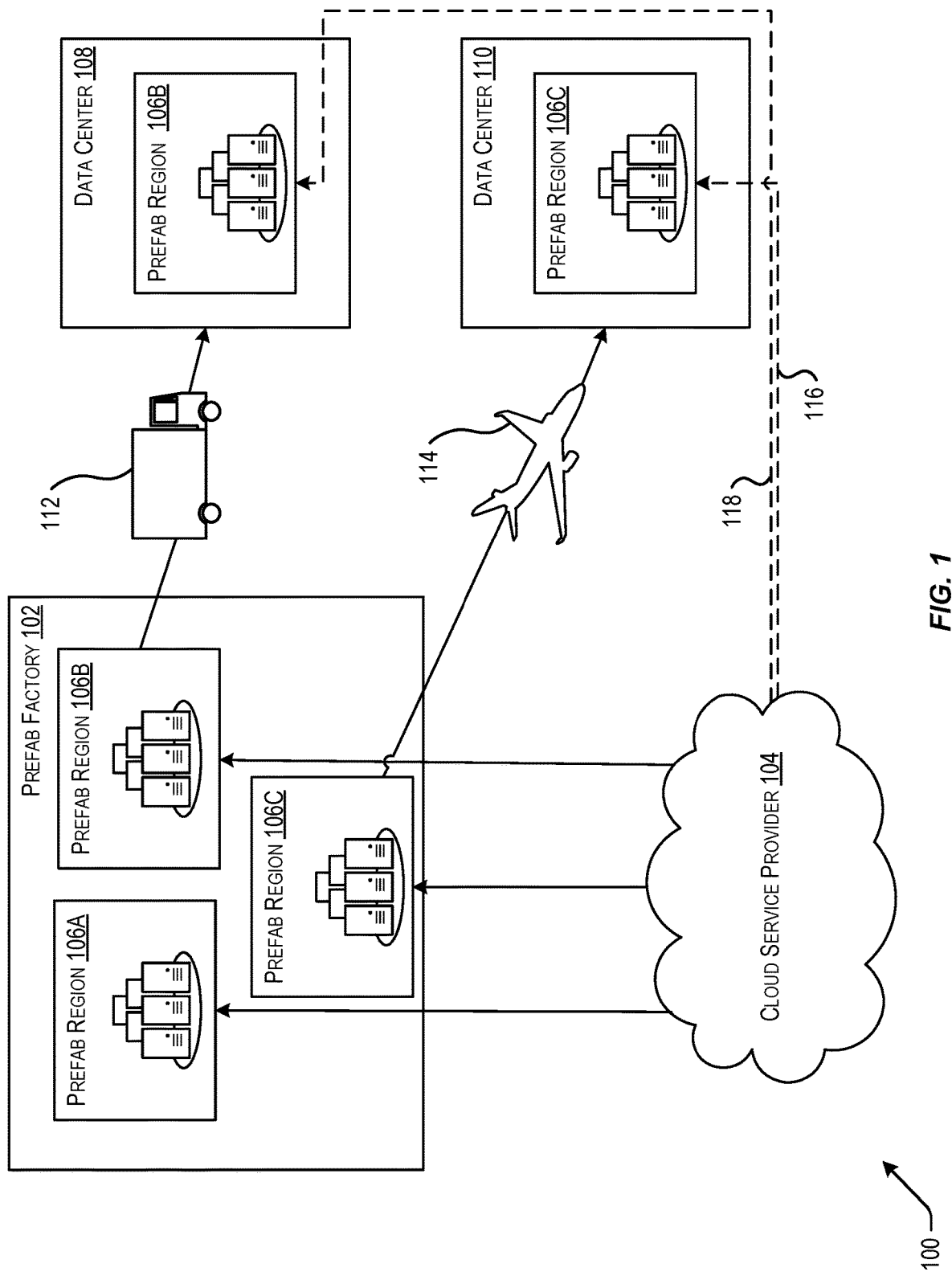
FIG. 1 is a block diagram illustrating a prefabrication factory for building regions and preparing the region computing devices for transportation to target data centers, according to at least one embodiment.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure, and which are used to provide a cloud service to a customer, are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, a government entity, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors, bare-metal computers), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center leads to shorter latency resulting in more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers)) and configuring it to provide cloud services in a region is sometimes also referred to as building a region. The term "region build" is used to refer to building one or more data centers in a region. Building a region involves provisioning or creating a set of new resources that are needed or used for providing a set of services that the data center is configured to provide. The end result of the region build process is the creation of a region, where the data center, together with the contained hardware and software resources, is capable of providing a set of services intended for that region and includes a set of resources that are used to provide the set of services.

Building a new region is a very complex activity requiring extensive coordination between various bootstrapping activities. At a high level, this involves the performance and coordination of various tasks such as: identifying the set of services to be provided by the data center; identifying various resources that are needed for providing the set of services; creating, provisioning, and deploying the identified resources; wiring the underlying hardware properly so that they can be used in an intended manner; and the like. Each of these tasks further have subtasks that need to be coordinated, further adding to the complexity. Due to this complexity, presently, the building of a region involves several manually initiated or manually controlled tasks that require careful manual coordination. As a result, the task of building a new region (i.e., building one or more data centers in a region and configuring the hardware and software in each data center to provide the requisite cloud services) is very time consuming. It can take time, for example many months, to build a region. Additionally, the process is very error prone, sometimes requiring several iterations before a desired configuration of the region is achieved, which further adds to the time taken to build a region (e.g., deploy hardware and software resources). These limitations and problems severely limit a CSP's ability to grow computing resources in a timely manner responsive to increasing customer needs.

Recent innovations allow CSPs to reduce build time, reduce computing resource waste, and reduce risk related to building a region. A CSP may employ an orchestration service to bootstrap services into a new region. The orchestration service may be a cloud-based service hosted within a separate region (e.g., an orchestration region) from the target region. To bootstrap services into the target region, the orchestration service can create a bootstrapping environment to host instances of one or more cloud services. The orchestration service can then use the services in the bootstrapping environment to support the deployment of services into the target region.

Even more recent innovations allow CSPs to centralize the region build operations to one or more facilities that can act as "factories" to produce partially or fully configured physical infrastructure for subsequent delivery to a destination site. Instead of waiting for the construction of a target region data center and the installation of physical components (e.g., servers, network switches, power supply, etc.) at the data center before bootstrapping the services into the target region, a CSP can build regions in a prefab factory, ship the configured physical components, like racks, to the destination data center, and then finalize and verify the components of the region once the racks arrive at the destination site. The prefab factory is capable of building multiple regions simultaneously. Each region being built at the prefab factory can have separate configurations, network topologies, and services. By building the regions at a prefab factory, the complexity of scheduling and logistics related to preparing the destination facility, delivering physical components to the destination facility, and managing bootstrapping resources within the cloud services can be greatly reduced, since the regions can be built in advance and maintained until the destination site is ready.

A prefab factory can also be used to build computing components to be integrated into on-premises solutions for customers, for example, when the customer controls and manages its own data center environment.

The centralized prefab factory supports additional innovations for building regions in an efficient manner. The prefab factory can include a static network fabric consisting of networking infrastructure (e.g., network switches, routers, cabling, etc.) designed to support any potential configuration of region components built in the factory. As such, the static network fabric can allow for physical resources of the region to be placed in the factory and quickly connected to the existing network fabric. Regions with different network topologies can also be quickly connected to the same network fabric according to connection plans that match the static network fabric with the physical components of the region. The static network fabric can reduce the complexity of network connections of the regions within the factory, increasing the speed at which the region components are installed in the factory and removed from the factory in preparation for transmission. In a complementary manner, because the static network fabric provides a set of dedicated network connections for devices at different locations within the prefab factory, these connections can be protected by a cable terminal protection apparatus (CTPA) that is designed to accommodate each possible network connection (e.g., Ethernet, fiber optic, etc.) that can be used to connect the region to the factory network.

The present disclosure is directed to a prefab factory in which automated region builds are performed using one or more prefab services. A prefab manager service can orchestrate the overall building of a region at the prefab factory. The manager service can work in conjunction with the one or more additional prefab services to manage the inventory of physical components used to construct the region at the prefab factory, configure the network (e.g., endpoints, network topology, addresses and/or other identifiers of the components within the region), bootstrapping services onto the region infrastructure, preparing the components for transmission of the region (including encrypting data volumes to provide security during transit), verifying the region after delivery to and installation at the destination site, and finalizing the configuration of the region, including performing any remaining bootstrapping or updating operations for the services deployed to the region infrastructure previously at the prefab factory. In addition, the present disclosure describes features of the prefab factory itself that improve the automated region build activities therein, including a static network fabric of the prefab factory that is configured to support any potential region network topology without needing ad hoc modifications, as well as dedicated CTPAs to improve the performance of the static network fabric. Finally, this disclosure also describes a mobile prefab factory that can perform some, any, or all of the operations related to automated region build in the prefab factory while the region components are in transit to the destination site.

Certain Definitions

A "region" is a logical abstraction corresponding to a collection of computing, storage, and networking resources associated with a geographical location. A region can include any suitable number of one or more execution targets. A region may be associated with one or more data centers. A "prefab region" describes a region built in a prefab factory environment prior to delivery to the corresponding geographical location. In some embodiments, an execution target could correspond to the destination data center as opposed to the prefab factory data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents an "instance" of a service or an instance of change to be applied to a service. A single service can be bootstrapped to each of one or more execution targets. An execution target may be associated with a set of devices (e.g., a data center).

"Bootstrapping" a single service is intended to refer to the collective tasks associated with provisioning and deployment of any suitable number of resources (e.g., infrastructure components, artifacts, etc.) corresponding to a single service. Bootstrapping a region is intended to refer to the collective of tasks associated with each of the bootstrap of each of the services intended to be in the region.

A "service" refers to functionality provided by a set of resources, typically in the form of an API that customers can invoke to achieve some useful outcome. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file), credentials, for an infrastructure component, or the like.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" or "software resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, a dynamic host configuration protocol service (DHCP), a domain name service (DNS), and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. These services can be staged and tested in the ViBE prior to the prefab region (e.g., the target region) being available.

A "Manager Service" may refer to a service configured to manage provisioning and deployment operations for any suitable number of services as part of a prefab region build. A manager service may be used in conjunction with one or more additional prefab services to orchestrate a region build in a prefab factory as well as for managing how the prefabbed region is installed and configured at the destination data center after it is built and shipped over. The manager service and other prefab services may be hosted in an existing region of a CSP.

A "host region" refers to a region that hosts a virtual bootstrap environment (ViBE). A host region may be used to bootstrap a ViBE.

A "target region" refers to a region under build in the prefab factory. During a prefab region build, the target region is associated with physical space, power, and cooling provided by the prefab factory. After bootstrapping, once the prefabbed region has been shipped to the destination data center, the prefabbed region is associated with the destination data center into which it gets installed.

Prefab Region Build

In some examples, techniques for building a region at a prefab factory are described herein. Such techniques, as described briefly above, can include one or more prefab services (e.g., manager service, network service, inventory service, testing service, deployment orchestration system) hosted by a CSP that can manage bootstrapping (e.g., provisioning and deploying software to) infrastructure components for one or more regions within the prefab factory. The prefab factory may be configured to support multiple region builds simultaneously. For example, physical resources (e.g., server racks, network switches, etc.) of a first prefab region may be installed at one location in the prefab factory while physical resources of a second prefab region may be installed at a second location in the prefab factory. Each prefab region can be connected to a dedicated network fabric of the prefab factory to provide networking connections to each prefab region independently, so that each region can communicate with the prefab services and/or other cloud services to support the region build. Based on a build request (a specification of the region, e.g., a number of server racks for the region, a number of computing devices, a number and type services to be hosted by the region, a network topology of the region, etc.), the prefab services can generate instructions to install (e.g., by factory personnel) the corresponding physical infrastructure in the prefab factory, which can include networking the physical devices together on their racks, positioning the racks at locations in the prefab factory, and connecting the devices to the static network fabric of the prefab factory. The manager service can then orchestrate the provisioning of the region infrastructure and deployment of software resources to the prefab region infrastructure, configure the prefab region for transmission, manage (e.g., schedule and monitor) the transmission of the prefab region, and perform testing and verification of the prefab region once it reaches its destination site.

The prefab factory can centralize the region build process to provide more efficient use of computing and networking resources that support region build. For example, the prefab factory may be sited "close" (e.g., with low-latency and high data rate networking connections) to a host region that includes the prefab services and/or a ViBE. Multiple regions may be built using the improved performance of the network connection to the host region, avoiding potential poor performance when performing a region build to a newly constructed data center site for typical region build. The prefab factory also provides improved physical and computational security for the devices during region build, as the CSP can control the prefab factory and the network connections therein.

In addition, the prefab factory improves the management of the inventory of physical components. The manager service can determine which computing devices are needed for a particular region build, which may be stored at or near the prefab factory. As regions are built and shipped, infrastructure for new regions can be quickly moved into the prefab factory and installed, increasing efficiency.

Turning now to the figures, FIG. 1 is a block diagram illustrating a prefabrication system 100 including a prefab factory 102 for building regions (e.g., Prefab Region 106A, Prefab Region 106B, Prefab Region 106C) and preparing the region computing devices for transmission to target data centers (e.g., data center 108, data center 110), according to at least one embodiment. Each region being built in the prefab factory 102 can include one or more devices that form the computing environment of a data center. The prefab factory 102 can be used to build multiple regions simultaneously. For example, prefab factory 102 can build all of Prefab Region 106A, Prefab Region 106B, and Prefab Region 106C at the same time. In some examples, the devices of a region may be installed and staged in the prefab factory 102 prior to beginning infrastructure provisioning and software deployment operations.

The prefab factory 102 can be a facility similar to a data center, including sufficient power, cooling, and networking infrastructure to support building one or more regions. The prefab factory 102 may be located in proximity to existing computing infrastructure of a CSP (e.g., CSP 104). For example, CSP 104 can operate existing data centers for one or more regions. The prefab factory 102 can be located close to or even adjacent to an existing data center of a host region to provide high data rate network connections between the cloud services of the CSP and the computing devices of the regions being built in the prefab factory 102. Additionally or alternatively, the prefab factory 102 can be located to improve logistical operations including shipping of regions to destination data centers.

A prefab region being built in the prefab factory 102 can include any suitable number of physical resources, including computing devices (e.g., servers, racks of multiple servers, etc.), storage (e.g., block storage devices, object storage devices, etc.), networking devices (e.g., switches, routers, gateways, etc.), and the like. Each region may have different physical resources according to the specific requirements of the destination region and data centers. For example, Prefab Region 106A may include 100 racks each having 40 computing devices, while Prefab Region 106B may include 20 racks each having 30 computing devices. Each rack of computing devices can include one or more networking devices communicatively connected to the server devices on the rack and configured to connect to networking infrastructure of the prefab factory 102 to form a network with other computing devices of the prefab region. Each rack can also include power supplies and cooling devices to support the operation of the computing devices on the racks.

The prefab factory 102 can include any suitable number of networking devices to support the installation and connection of the one or more computing devices of the prefab regions being built. For example, the prefab factory 102 can include any suitable number of leaf and spine switches to support the connection of computing devices on multiple racks to form the network of a prefab region. Similarly, the prefab factory 102 can include network cabling installed in the facility that can provide network connections to the networking infrastructure of the prefab factory 102. The network cabling may be positioned to terminate at locations within the prefab factory 102 where racks of computing devices for the prefab regions may be installed during region build operations. Additional details about the networking infrastructure and configuration of the prefab factory are provided below with respect to FIGS. 9-11.

The prefab factory 102 may be connected over one or more networks to services provided by CSP 104. During region build operations, CSP 104 can provision infrastructure components on the physical resources of the prefab regions and deploy software resources, configurations, and/or other artifacts to the provisioned infrastructure components. For example, CSP 104 can provision the computing devices of Prefab Region 106A to host one or more virtual machines, provide hostnames, network addresses, and other network configurations for the provisioned physical and virtual devices, and then deploy one or more services to be executed on the provisioned infrastructure. The prefab region may be brought to a state that is close to the final production state of the devices when they are installed at the destination facility.

Once the prefab region has been built, the physical resources may be configured for transmission/transportation to the destination facility. As used herein, the term "transmission" may be used synonymously with the term "transportation" within the context of moving the physical resources associated with the prefab region from the prefab factory to a destination site. Configuring the prefab region for transmission can include obtaining a "snapshot" of the current network configuration of the computing devices in the prefab region, storing the snapshot, providing a portion of the snapshot to each computing device that includes identifiers for each device and its neighboring devices within the network, encrypting data volumes of the computing devices, and configuring the devices to boot into a test state when powered on after transmission. In addition to network snapshots, the prefab services of the CSP 104 may also capture device snapshots which are disk images taken of fully configured individual switches, compute devices, and smart NICs in the various racks to be shipped to the destination site. The device snapshots can enable rapid replacement of any device in the racks that get shipped if that device is non-functional after arrival and has to be replaced. Transportation to a destination facility may be by one or more methods, including shipment by truck 112 or shipment by aircraft 114. For example, Prefab Region 106B may be configured to be delivered by truck 112 to data center 108, while Prefab Region 106C may be configured to be delivered by aircraft 114 to data center 110.

Once the computing devices of a prefab region arrive at the destination facility, they may be installed at the facility according to the configuration of the facility. The destination facilities can be data centers that have been built to host the prefab region devices, with networking, power, cooling, and other infrastructure provided according to the configuration of the prefab region. The data centers can have network connections to the CSP 104. Installation of the prefab region can include manual operations for connecting racks and their computing devices to the network infrastructure of the data centers and other related tasks. Once the physical connections have been made, the devices of the prefab region can be powered on, which can initiate one or more testing operations by the devices based on the configuration that was performed at the prefab factory 102 prior to transmission. The prefab regions can also connect to the CSP 104 via one or more network connections to the data center to communicate with prefab services. For example, Prefab Region 106B can connect to CSP 104 via connection 118, while Prefab Region 106C can connect to CSP 104 via connection 116. The prefab services can deploy final configurations for the installed devices, deploy updates to software resources on the installed devices, and perform additional testing and verification operations for the prefab region at the destination data center.

Figure 2:
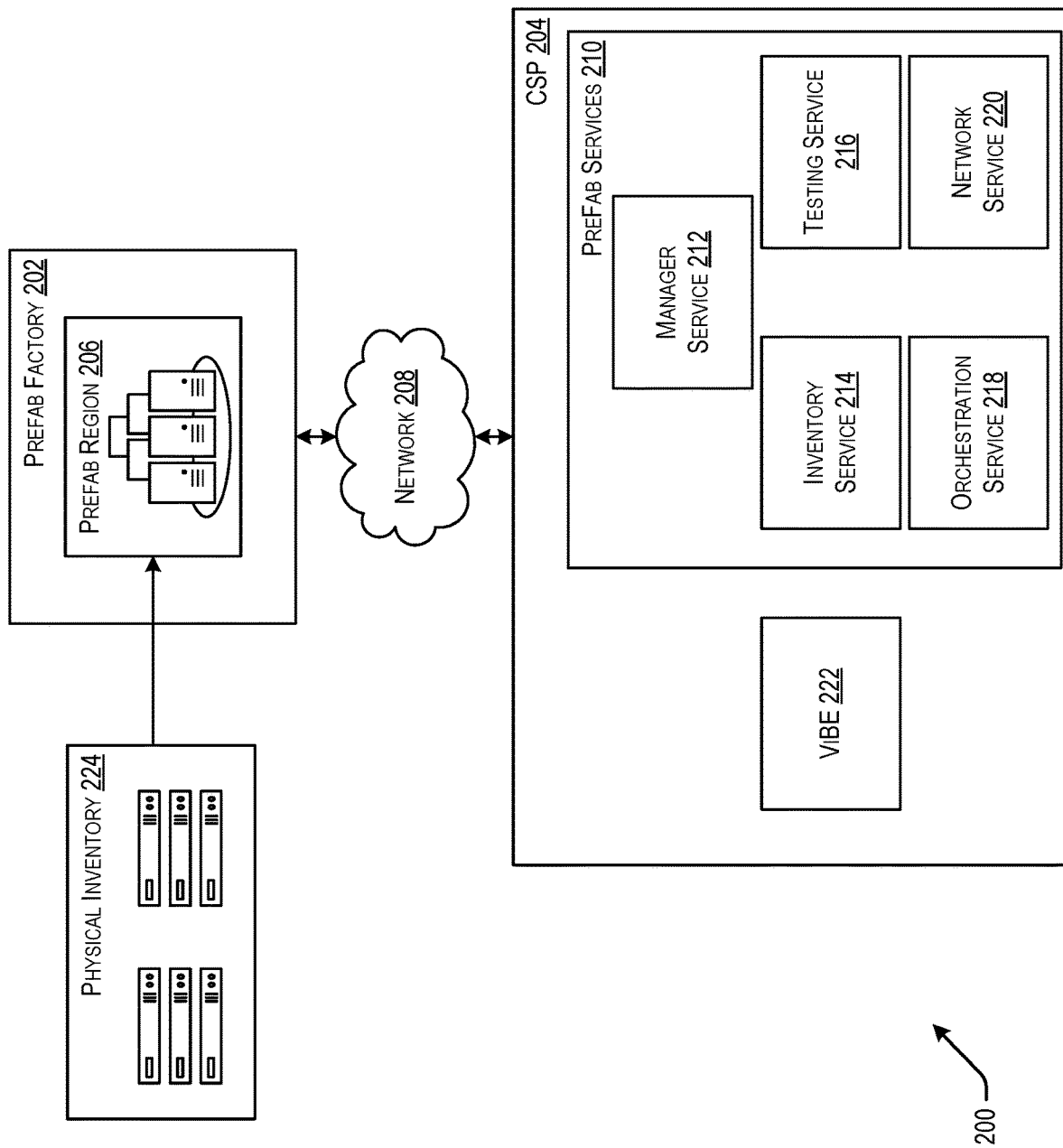
FIG. 2 is a block diagram illustrating a prefab factory connected to services provided by a CSP for building regions, according to at least one embodiment.

FIG. 2 is a block diagram illustrating a prefabrication system 200 including a prefab factory 202 connected to prefab services 210 provided by a CSP 204 for building regions, according to at least one embodiment. The prefab factory 202 may be an example of prefab factory 102 of FIG. 1, and CSP 204 may be an example of CSP 104 of FIG. 1. The prefab factory 202 may interface with the CSP 204 via network 208, which may be a public network like the Internet, a private network, or other network. The prefab services 210 can include manager service 212, inventory service 214, testing service 216, orchestration service 218, and network service 220. The prefab services 210 can perform operations corresponding to building the prefab region 206 in the prefab factory 202, including managing a bootstrapping environment (e.g., ViBE 222), provisioning infrastructure components in the Prefab Region 206, deploying software resources to the Prefab Region 206, configuring the network of the Prefab Region 206, testing the Prefab Region at various points during the build process, and managing the physical inventory (e.g., physical inventory 224) of computing devices used to build Prefab Region 206 and other prefab regions being built at prefab factory 202.

The manager service 212 can perform tasks to coordinate the operations of the prefab services 210, including scheduling prefab region build operations by other prefab services 210, generating physical build requests and corresponding instructions, initiating shipping of the prefab region 206 to a destination site, and managing the provisioning and deployment of resources in the prefab region 206 both in the prefab factory 202 and at the destination site. A physical build request can specify the number and type of physical resources to be used in Prefab Region 206. The physical build request can also include a set of instructions usable by personnel to install the corresponding physical resources in the prefab factory 202. For example, the manager service 212 may generate a physical build request that specifies the number of racks and server devices for Prefab Region 206, the number of networking devices usable to connect the server devices to form the network of Prefab Region 206, and the connection plan that determines the networking connections between the specified server devices, networking devices, and the existing networking infrastructure of the prefab factory 20. The physical build request can also include instructions for personnel to obtain physical devices from an associated location (e.g., physical inventory 224) and instructions to install the devices in the prefab factory 202 at specified locations. In some embodiments, operations of the physical build request may be performed by automated systems under the control of the manager service 212. For example, obtaining racks of server devices from physical inventory 224 and installing the racks at prefab factory 202 may be performed by a robotic system configured to move physical racks from site to site.

The inventory service 214 may be configured to track and monitor physical devices corresponding to one or more regions (e.g., one or more data centers of a region). The inventory service 214 can also track physical devices for one or more prefab regions (e.g., Prefab Region 206) in the prefab factory 202. Tracking and monitoring the physical devices can include maintaining an inventory of the devices according to an identifier of the device (e.g., serial number, device name, etc.) and the association of the devices with a data center. The inventory service 214 can provide inventory information to other prefab services 210, including manager service 212, for use in the prefab region build process. For example, inventory service 214 can determine if a physical device is located at prefab factory 202 or at a destination site. Inventory service 214 can query devices to determine their location and/or association with a region, prefab region, or data center via a network (e.g., network 208). Inventory service 214 can also maintain a physical inventory (e.g., physical inventory 224) of devices that are stored for use in prefab region build operations. For example, inventory service 214 can track physical devices as they are received at the physical inventory 224 and then retrieved from the physical inventory 224 to be used as part of a prefab region at prefab factory 202. In some examples, inventory service 214 can provide inventory information to manager service 212 that is usable to generate a physical build request for Prefab Region 206 that includes instructions to obtain physical resources from physical inventory 224 and install the physical resources at the prefab factory 202.

The physical inventory 224 may be a warehouse or storage facility for storing physical resources (e.g., computing devices) for use in prefab region build operations. The physical inventory 224 may be located near the prefab factory 202 to facilitate retrieval of physical resources according to a physical build request. For example, the physical inventory 224 may be a building adjacent to a building used for the prefab factory 202. In some examples, the physical inventory 224 may be located within the prefab factory 202. Physical resources may be placed into and retrieved from the physical inventory 224 by personnel associated with the CSP and the prefab factory 202. In some instances, during prefab region build operations, the retrieval and installation of physical resources from physical inventory 224 may be done by robots, automated guided vehicles, or other similar autonomous or semi-autonomous systems using instructions provided by the physical build request.

The orchestration service 218 may be configured to perform bootstrapping operations to provision infrastructure components in the Prefab Region 206 and to deploy software resources to the Prefab Region 206. The orchestration service 218 can also construct a bootstrapping environment (e.g., ViBE 222) for use when bootstrapping resources into the Prefab Region 206. The orchestration service 218 may be an example of a deployment orchestrator described above. In some examples, the orchestration service 218 may be configured to bootstrap (e.g., provision and deploy) services into a prefab region (e.g., Prefab Region 206) based on predefined configuration files that identify the resources (e.g., infrastructure components and software to be deployed) for implementing a given change to the prefab region. The orchestration service 218 can parse and analyze configuration files to identify dependencies between resources. The orchestration service 218 may generate specific data structures from the analysis and may use these data structures to drive operations and to manage an order by which services are bootstrapped to a region. The orchestration service 218 may utilize these data structures to identify when it can bootstrap a service, when bootstrapping is blocked, and/or when bootstrapping operations associated with a previously blocked service can resume.

In some embodiments, the orchestration service 218 may include components configured to execute bootstrapping tasks that are associated with a single service of a prefab region. The orchestration service 218 can maintain current state data indicating any suitable aspect of the current state of the resources associated with a service. In some embodiments, desired state data may include a configuration that declares (e.g., via declarative statements) a desired state of resources associated with a service. In some embodiments, orchestration service 218 can identify, through a comparison of the desired state data and the current state data, that changes are needed to one or more resources. For example, orchestration service 218 can determine that one or more infrastructure components need to be provisioned, one or more artifacts deployed, or any suitable change needed to the resources of the service to bring the state of those resources in line with the desired state. Specific details about a particular implementation of orchestration service 218 is provided in U.S. patent application Ser. No. 11/016,754, entitled "Techniques for Deploying Infrastructure Resources with a Declarative Provisioning Tool," the entire contents of which are incorporated in its entirety for all purposes.

The ViBE 222 may be an example of a bootstrapping environment that can be used to deploy resources to a prefab region in a prefab factory 202. A ViBE can include a virtual cloud network (e.g., a network of cloud resources) implemented within a suitable region of a CSP (e.g., CSP 204). The ViBE can have one or more nodes (e.g., compute nodes, storage nodes, load balancers, etc.) to support operations to host services deployed by orchestration service 218. The ViBE services can in turn be used to support deployment of services into the Prefab Region 206. For example, orchestration service 218 may deploy an instance of one or more constituent services of the orchestration service 218 into the bootstrapping environment (e.g., an instance of orchestration service 218), which in turn may be used to deploy resources from the ViBE 222 to the Prefab Region 206. Because a ViBE is implemented as a virtual cloud network in an existing region, any suitable amount of region infrastructure may be provisioned to support the deployed services within the ViBE (as compared to the fixed hardware resources of a seed server). The orchestration service 218 may be configured to provision infrastructure resources (e.g., virtual machines, compute instances, storage, etc.) for the VIBE 222 in addition to deploying software resources to the ViBE 222. The ViBE 222 can support bootstrapping operations for more than one prefab region in the prefab factory 202 at the same time.

When the Prefab Region 206 is available to support bootstrapping operations, the ViBE 222 can be connected to the Prefab Region 206 so that services in the VIBE 222 can interact with the services and/or infrastructure components of the Prefab Region 206. This can enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped into the VIBE 222 and connected to the Prefab Region 206 in order to provision hardware and deploy services until the Prefab Region 206 reaches a self-sufficient state (e.g., self-sufficient with respect to services hosted within the Prefab Region 206). Utilizing the ViBE 222 allows for standing up the dependencies and services needed to be able to provision/prepare infrastructure and deploy software while making use of the host region's resources in order to break circular dependencies of core services.

The testing service 216 may be configured to perform one or more test operations or validation operations on the Prefab Region 206 following the provisioning and/or deployment of resources. The test operations may be part of a user-acceptance test usable to determine if the behavior of the built region conforms to a build specification. For example, testing service 216 may perform a test that interacts with an instance of a service deployed to the Prefab Region 206 to verify an expected operation of the queried service. As another example, testing service 216 may perform a networking test to obtain hostnames, networking addresses, and/or other identifiers of the components of the Prefab Region 206 to compare to the expected identifiers of the components as specified in a build request or other specification for the Prefab Region 206. Testing service 216 may perform test operations both during the prefab region build process at prefab factory 202 and after delivery of the Prefab Region 206 to a destination site. The testing operations performed at the prefab factory 202 may be the same or different from testing operations performed after the Prefab Region 206 is delivered to the destination site.

The network service 220 may be configured to determine the network configuration of the devices in the Prefab Region 206. The network service 220 can use configuration information from a build request to determine a network topology of the devices (e.g., servers, networking devices, racks of servers and networking devices, etc.). As used herein, a network topology may refer to a graph representation of all the networking connections between each computing device in a prefab region. The network service 220 can use the configuration information to determine physical networking connections (e.g., network cabling connections) to be made between the device in the prefab region. The network service 220 may provide the networking connection information to the manager service 212 to be used to generate instructions for physically installing the devices for the prefab region in the prefab factory 202. The network service 220 may also obtain device information from inventory service 214 as part of determining the network topology for the devices in a prefab region. Additional details about the network service 220 are provided below with respect to FIGS. 5 and 6.

Figure 3:
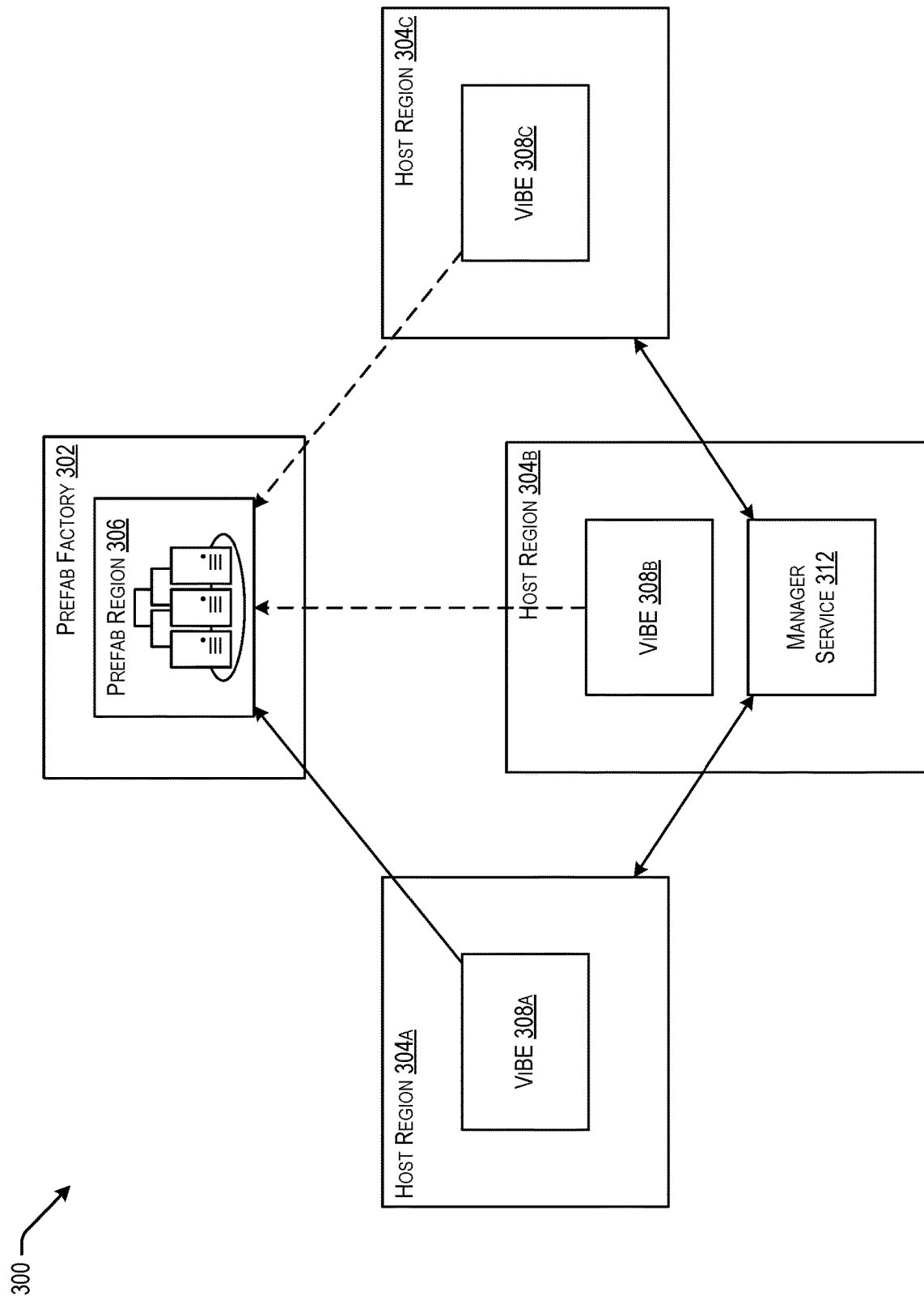
FIG. 3 is a block diagram illustrating a CSP system that includes multiple host regions that can support a ViBE for deploying software resources to a prefab region being built at a prefab factory, according to at least one embodiment.

FIG. 3 is a block diagram illustrating a CSP system 300 that includes multiple host regions (e.g., host regions 304A-304C) that can support a ViBE (e.g., ViBEs 308A-308C) for deploying software resources to a Prefab Region 306 being built at a prefab factory 302, according to at least one embodiment. Prefab factory 302 may be an example of prefab factory 202 described above with respect to FIG. 2. Similarly, ViBEs 308A-308C may each be examples of ViBE 222 of FIG. 2, while manager service 312 may be an example of manager service 212 of FIG. 2. Host regions 304A-304C may correspond to regions of the CSP and can be associated with one or more data centers having computing resources for hosting a ViBE. The host regions 304A-304C may correspond to different geographical locations.

As depicted in FIG. 3, the manager service 312 may be an instance within one host region (e.g., host region 304B). In some embodiments, the manager service 312 may correspond to a tenancy of the CSP and may therefore have an instance in multiple regions (e.g., host regions 304A, 304C) from which prefab services can be provided. Similarly, other prefab services (e.g., prefab services 210) may also be instances of services within a host region.

A ViBE may be hosted within a host region to support prefab region build operations at prefab factory 302. Because a ViBE may be constructed by an orchestration service (e.g., orchestration service 218) as needed for bootstrapping a prefab region, the ViBE can be built in any suitable host region. Suitability as a host region can be based on network connectivity to the prefab factory 302 (e.g., high-bandwidth, high data rate, low latency network connection between the data center(s) of the host region to the prefab factory 302), sufficient infrastructure resources to support the ViBE for one or more prefab region build operations (e.g., availability of computing resources in the host region for the length of time to provision and deploy the prefab region(s), and/or jurisdictional considerations (e.g., a host region in the same country as the prefab factory to comply with regulations regarding data security). For example, host region 304A may include a data center in close proximity to prefab factory 302, resulting in a low latency network connection between ViBE 308A and Prefab Region 306. During successive prefab region build operations, a ViBE used to support the prefab region build may be constructed in a different host region. For example, ViBE 308A may be used as part of a prefab region build at prefab factory 302 for one prefab region, but then ViBE 308B in host region 304B or ViBE 308C in host region 304C may be constructed and used for a subsequent region build operation.

In addition, the prefab factory 302 may be built in a location to provide suitable connectivity to one or more host regions. For example, prefab factory 302 may be constructed at a site adjacent to a data center of host region 304A, to provide suitable network connectivity between host region 304A and prefab factory 302.

Figure 4:
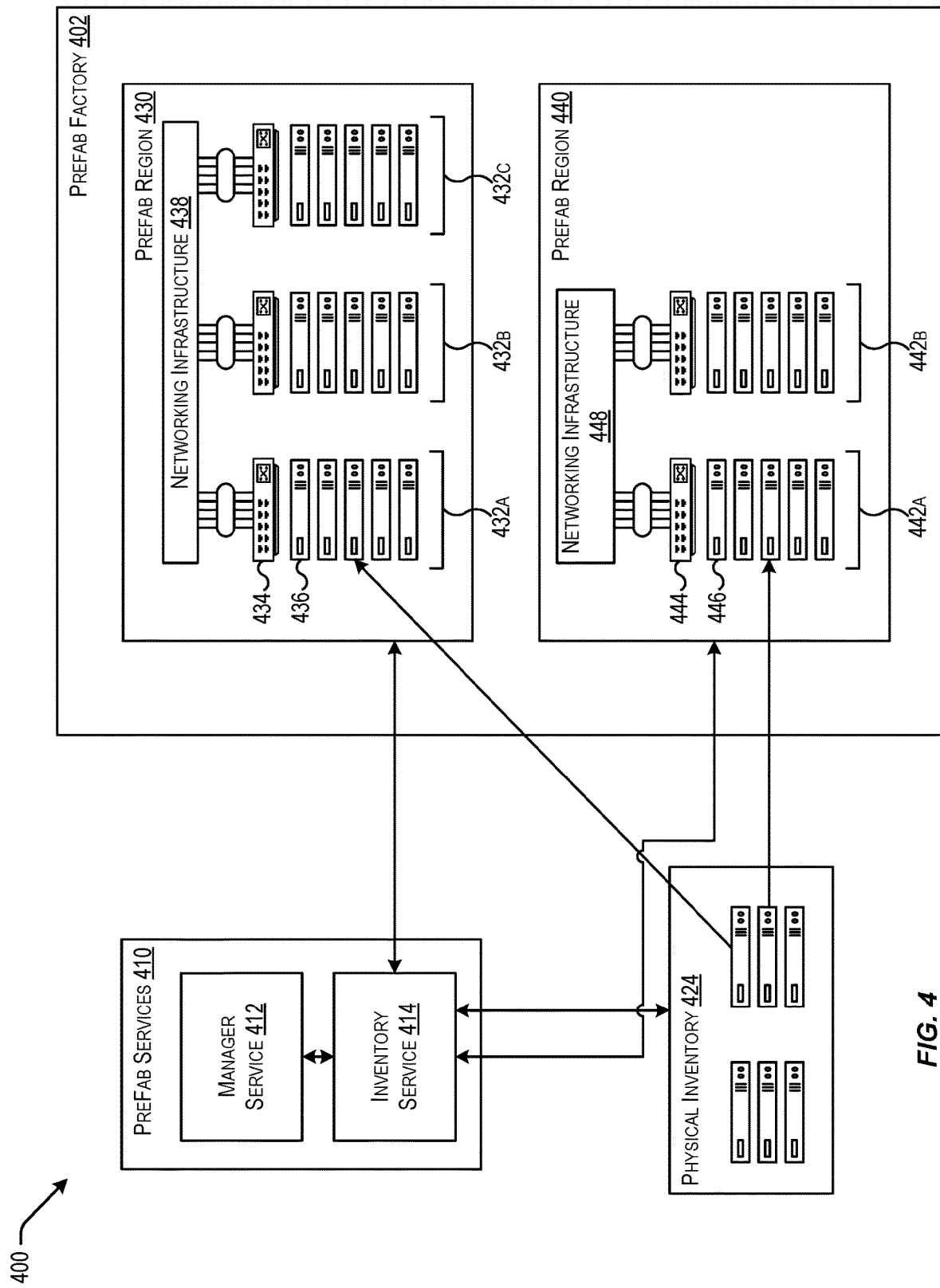
FIG. 4 is a block diagram illustrating an arrangement of physical computing resources in a prefab factory managed with a manager service and inventory service, according to at least one embodiment.

FIG. 4 is a block diagram illustrating a CSP system 400 having an arrangement of physical computing resources in a prefab factory 402 for different Prefab Regions 430, 440 according to at least one embodiment. Prefab factory 402 may be an example of prefab factory 202 of FIG. 2. Prefab services 410 may be provided by the CSP and may be examples of prefab services 210 described above with respect to FIG. 2, including manager service 412 as an example of manager service 212 of FIG. 2 and inventory service 414 as an example of inventory service 214 of FIG. 2. Similarly, Prefab Region 430 and Prefab Region 440 may be examples of other prefab regions described herein, including Prefab Region 206 of FIG. 2.

As described above, prefab factory 402 may support multiple prefab region build operations at the same time. As depicted in FIG. 4, prefab factory 402 includes Prefab Region 430 and Prefab Region 440. Prefab Region 430 can include one or more server racks 432A-432C. Each server rack can include one or more devices, including server devices and networking devices. For example, server rack 432A can include switch 434 and server device 436. Switch 434 may be a top-of-rack switch that provides networking connections to other server racks (e.g., via top-of-rack switches at the other server racks) or other physical resources of the Prefab Region 430. Networking connections between physical resources in Prefab Region 430 may include parts of networking infrastructure 438. Networking infrastructure 438 may include a portion of the networking infrastructure of prefab factory 402, including network cabling, network switches, routers, and the like that form the network fabric of the prefab factory 402. Similarly, Prefab Region 440 can include one or more server racks 442A-442B, which can include more or fewer computing devices than server racks 432A-432C of Prefab Region 430. For example, server rack 442A can include switch 444 and server device 446.

Each prefab region may be at a different point of the prefab region build process at any given time. For example, Prefab Region 430 may be undergoing infrastructure provisioning and resource deployment while Prefab Region 440 may be undergoing installation of physical resources. In addition, each prefab region at the prefab factory 402 may include a different arrangement of physical resources. For example, Prefab Region 430 can include a greater number of server racks (e.g., racks 432A-432C) than Prefab Region 440, with each server rack supporting a greater number of computing devices than the server racks of Prefab Region 440 (e.g., server racks 442A, 442B). Because the number and arrangement of physical resources in each prefab region can be different, the network topology corresponding to the connections between the physical resources can be different for each prefab region.

Inventory service 414 can track physical resources used to form the prefab regions in the prefab factory 402. The physical resources tracked by inventory service 414 can included server devices and networking devices as well as racks of server devices and networking devices. Inventory service 414 can also track physical resources at data centers for deployed regions, including prefab region devices after delivery to and installation at a destination site. In some embodiments, inventory service 414 can connect to the prefab regions (e.g., via a network) and query device identifiers for devices in the prefab regions. Inventory service 414 may provide information corresponding to the physical resources in a prefab region to manager service 412 as part of prefab region build operations. For example, manager service 412 may use inventory information from inventory service 414 to determine if physical resources for a prefab region were installed according to a physical build request. In some embodiments, inventory service 414 can also maintain information corresponding to physical inventory 424 (e.g., a repository, warehouse, or other storage for computing devices and other physical resources used to construct a prefab region). Maintaining the physical inventory 424 can include tracking the number and type of physical resources available for use in a prefab region, maintaining a database or other datastore of inventory information, updating the inventory information as new physical resources are added to physical inventory 424 (e.g., delivery of new devices, construction of a server rack, etc.), and updating the inventory information as devices leave the physical inventory for use in the prefab factory 402 (as depicted by the arrows in FIG. 4). In some examples, CSP personnel may interact with inventory service 414 to provide manual updates to inventory information.

The manager service 412 can obtain inventory information from inventory service 414 for use when generating a physical build request. For example, the inventory information may be used by manager service 412 to determine which physical resources to install in the prefab factory 402 for a prefab region corresponding to the physical build request.

Figure 5:
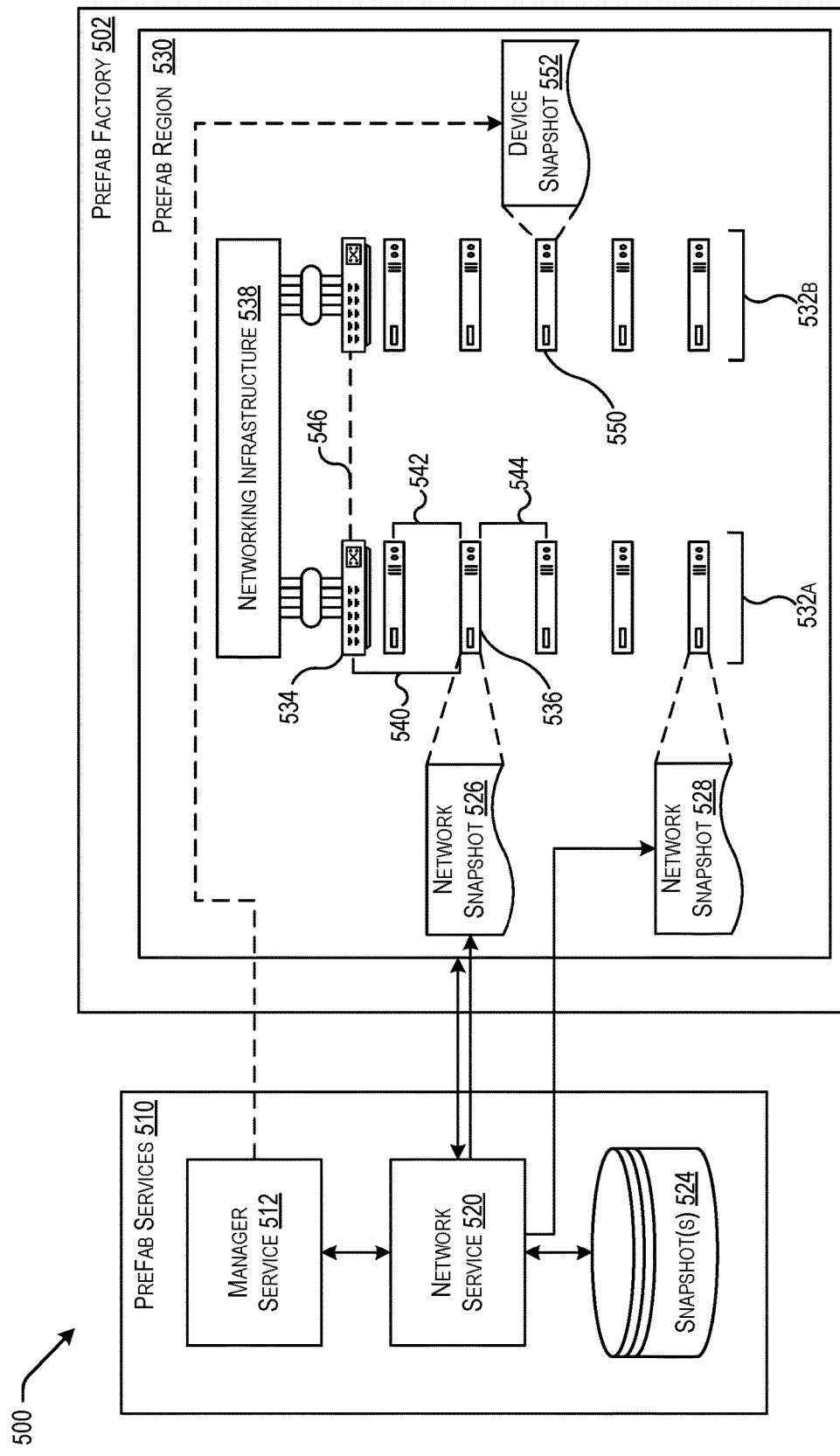
FIG. 5 is a diagram illustrating managing a network configuration of computing resources of a region being built in a prefab factory using a manager service and a network service, according to at least one embodiment.

FIG. 5 is a diagram illustrating a CSP system 500 for managing a network configuration of computing resources of a Prefab Region 530 being built in a prefab factory 502 using a manager service 512 and a network service 520, according to at least one embodiment. The prefab factory 502 and Prefab Region 530 may be examples of other prefab factories and prefab regions described herein, including prefab factory 202 and Prefab Region 206 of FIG. 2. Prefab services 510 may be provided by the CSP and may be examples of prefab services 210 described above with respect to FIG. 2, including manager service 512 as an example of manager service 212 of FIG. 2 and network service 520 as an example of network service 220 of FIG. 2.

As described above with respect to FIG. 2, the manager service 512 can perform tasks to coordinate the operations of the prefab services 510, including scheduling prefab region build operations by other prefab services 510, generating physical build requests and corresponding instructions, and configuring Prefab Region 206 for shipping to a destination site. A physical build request can specify the number and type of physical resources to be used in Prefab Region 206. The network service 520 can use configuration information from a build request to determine a network topology of the devices (e.g., servers, networking devices, racks of servers and networking devices, etc.). The network service 520 can also determine the network configuration of devices of the Prefab Region 530 after the provisioning of infrastructure components in the Prefab Region 530.

In some examples, the network service 520 can store a snapshot of the network configuration of a prefab region (e.g., Prefab Region 530). A snapshot can include information about the network topology of the prefab region at a specific point in time, including network identifiers (e.g., network addresses, hostnames, etc.) for the devices in the prefab region, the current network connections between the devices, the physical networking interfaces between the devices and the networking infrastructure 538 of the prefab factory 502, and network settings for the devices (e.g., port configurations, gateway configurations, etc.). As an example, server device 536 may be a computing device in server rack 532A of Prefab Region 530. Server device 536 may have a networking connection 540 to switch 534 of server rack 532. The network configuration of Prefab Region 530 can then include information associating server device 536 to switch 534, including information specifying the type of network connection 540, the port of switch 534 to which server device 536 is connected, and the settings of both server device 536 and switch 534 that correspond to the networking connection 540 between them. In addition, the network configuration can include information that associates server device 536 with "neighboring" devices in Prefab Region 530 that have networking connections 542, 544 between them. The networking connections 542 and 544 may be via switch 534, so that server device 536 may be communicatively connected to other devices in server rack 532A via network connections 542, 544. In some examples, "neighboring" devices of a given device in Prefab Region 530 can include each computing device on the same server rack. In addition, switch 534 may have a network connections to one or more other switches within Prefab Region 530 (e.g., network connection 546 to a switch of server rack 532B).

The network snapshot may be used to validate the physical installation (e.g., physical networking connections) of Prefab Region 530 after the devices are installed at the destination site. For example, network service 520 can provide the network snapshot (or a portion of the snapshot) to each device in the Prefab Region 530 as part of configuring the Prefab Region 530 for transportation to a destination site. For example, network service 520 may provide network snapshot 526 to server device 536 for storage at server device 536. Network snapshot 526 may be a portion of the network snapshot corresponding to the network configuration of the entire Prefab Region 530. Network snapshot 526 can include an identifier (e.g., network address, hostname, etc.) for server device 536 and information associating server device 536 with one or more other devices in Prefab Region 530. The information associating server device 536 with a neighboring device can include an identifier for the neighboring device and information about the network connection between them. For example, server device 536 can use network snapshot 526 to identify neighboring devices and communicate with the neighboring devices over the network connection.

The network service 520 may also maintain a network configuration for the network fabric of the prefab factory 502. For example, the prefab factory 502 can have networking infrastructure to support multiple, separate prefab regions being built at the same time. The prefab factory 502 can have multiple dedicated locations for placing server racks for the prefab regions being built. Each location may have a set of networking cables of the networking infrastructure that terminate at the location that can be connected to the server racks. Based on the devices placed at the location, specific cables from the set of networking cables can be connected to the devices (e.g., to a top-of-rack switch) to connect the devices to other devices in the prefab region using a portion of the network fabric of the prefab factory 502. For example, server rack 532A may be placed at a location within the prefab factory 502 and connected to networking infrastructure 538 using switch 534, while server rack 532B may be placed at a second location and connected to networking infrastructure 538.

In addition to operations for preserving the network configuration of the Prefab Region 530, configuring Prefab Region 530 for transportation to a destination site can also include the manager service 512 configuring each device to enter a testing state during a subsequent power-on of the device, encrypting data volumes of the devices with encryption keys, storing the encryption keys at a device that can act as a key server for the Prefab Region 530 during initialization at the destination site, and configuring one of the devices to act as dynamic host configuration protocol (DHCP) server during initialization of the Prefab Region 530 at the destination site. Manager service 512 may also generate instructions usable by personnel or robotic systems associated with the prefab factory 502 for packing the devices for transmission. Manager service 512 may also generate instructions usable by personnel associated with the destination facility for installing and connecting the devices at the destination facility.

In some embodiments, configuring the devices of Prefab Region 530 can also include operations to capture device snapshots of each device. A device snapshot can include a software image of one or more disk drives or other memory of a computing device, which can be used to duplicate the software configuration of the device onto a replacement device. The manager service 512 can generate the device snapshots in conjunction with one or more of the prefab service 510. The device snapshots may be stored along with the network snapshot(s) in a database or datastore (e.g., snapshot(s) 524). As a particular example, manager service 512 can generate device snapshot 552 of server device 550 of Prefab Region 530 at the prefab factory 502. The device snapshot 552 may be used to image another physical device that has the same or similar physical configuration as server device 550 in order to create a duplicate server device in the event that server device 550 fails (e.g., damaged or lost during transit to the destination site).

Figure 6:
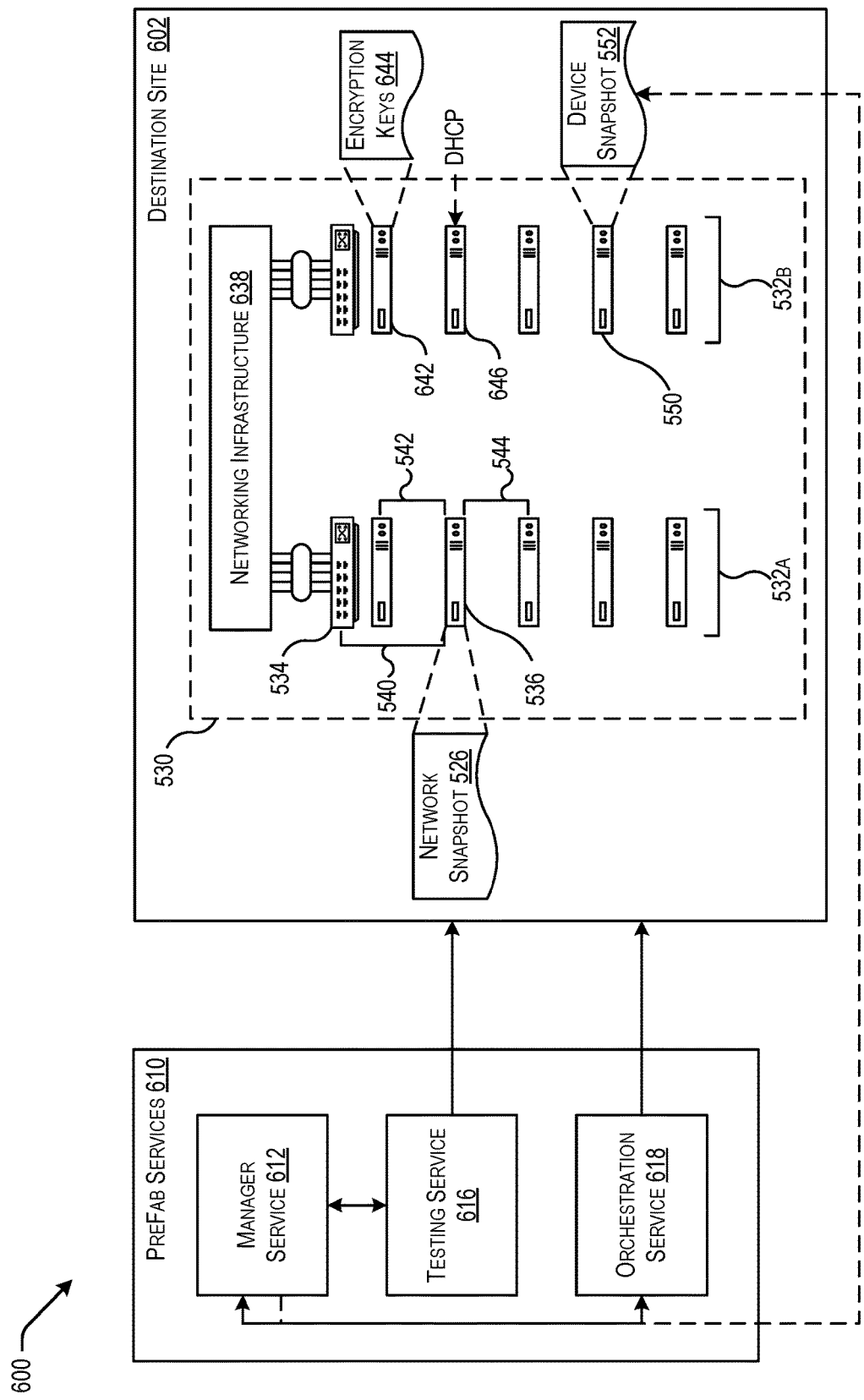
FIG. 6 is a diagram illustrating a testing and evaluation of a region after delivery to a destination site using a manager service and a testing service, according to at least one embodiment.

FIG. 6 is a diagram illustrating a CSP system 600 for testing and evaluation of a Prefab Region 530 after delivery to a destination site 602 using a manager service 612 and a testing service 616, according to at least one embodiment. The destination site 602 may be a data center facility at a location corresponding to new region to be deployed for the CSP using the computing resources of Prefab Region 630. Prefab services 610 may be provided by the CSP and may be similar to prefab services 210 of FIG. 2, including manager service 612 as an example of manager service 212, testing service 616 as an example of testing service 216, and orchestration service 618 as an example of orchestration service 218 of FIG. 2.

Shipping Prefab Region 530 to the destination site 602 can include powering down each device, disconnecting the devices from the networking infrastructure of the prefab factory, and packing the devices as appropriate for transit. Server racks (e.g., server racks 532A, 532B may be shipped intact, without disconnecting individual devices of the server rack. Once delivered to the destination site 602, the server racks may be positioned in the destination site 602 per the physical layout of the resulting data center and connected to the networking infrastructure 638 of the destination site. For example, networking connections may be made between the networking infrastructure 638 and the switches of the server racks 532A, 532B by connecting one or more networking cables to the switches (e.g., switch 534).

As described above, the devices in Prefab Region 530 may have been configured to boot into a test mode when first powered on at the destination site 602. In some embodiments, the devices may have a dedicated boot volume to support the test mode during initialization at the destination site 602. In other embodiments, the boot volume may be configured on an external device connected to each device in the Prefab Region 530. For example, each server device (e.g., server device 536) may be connected to a smart network interface card (SmartNIC) that provides a low-overhead boot volume that can be used to boot the server device into a test mode. Because the boot volume may only be used to support the test mode, the data on the boot volume may not need to be encrypted as with data volumes on the server devices.

The test mode may be configured to cause each computing device to validate its connection to other devices in the Prefab Region 530. The validation can determine if the physical network connections of the devices to the networking infrastructure 638 at the destination site 602 were made correctly. To validate a connection, a device in the test mode may use a stored network configuration or portion of the network configuration that was determined by a network service (e.g., network service 520 of FIG. 5) and stored at each device. For example, server device 536 can use network snapshot 526 to determine a neighboring computing device that is communicatively connected to server device 536 by network connection 542. To validate the network connection 542, server device 536 may send a validation request to the neighboring computing device. If the network connection 542 is intact, then server device may receive a validation indication from the neighboring computing device that indicates that the validation request was successfully received at the neighboring computing device. The server device 536 may validate all of the connections specified in network snapshot 526. Similarly, devices on one server rack (e.g., server rack 532A) may validate a connection to each other server rack (e.g., server rack 532B) in the Prefab Region 530.

In some embodiment, one device of Prefab Region 530 may be configured to act as a DHCP server (e.g., DHCP server 646). The DHCP server 646 may provide network addresses or other identifiers to the devices in Prefab Region 530 during initialization. For example, during test mode, each device may validate a connection to the DHCP server 646 and then receive an address, identifier, or other network configuration information from the DHCP server 646. The device may compare the received identifier to an identifier included in the network configuration that was generated by the network service during prefab region build operations at the prefab factory. For example, server device 536 can receive an identifier from DHCP server 646 and then compare the received identifier to an identifier in network snapshot 526. Because the Prefab Region 530 should not have undergone any component changes during transit, the network configuration of the Prefab Region 530 at the destination site 602 should be unchanged, including configuration information from DHCP server 646. That is to say, server devices in the Prefab Region should receive the same network addresses from DHCP server 646 after installation of the devices at the destination site 602. If the network configuration changes, then the server devices can indicate that the network configuration of Prefab Region 530 may be incorrect.

In some embodiments, if any device was damaged in transit and no longer works, operators at the destination site may replace the broken device with a new replacement device and configure the new device with the device snapshot taken prior to shipping thus allowing the on-site post-install validation to complete successfully even if there was hardware failure in transit. For example, server device 550 may be damaged during transportation to the destination site 602. Discovery of the non-functional state of server device 550 may occur during testing operations to validate the network configuration of the Prefab Region 530. To recover, the manager service 612 can generate instructions to replace server device 550 with an identical physical device at the same location on server rack 532B. Once the replacement device is installed, the manager service 612 can deploy the device snapshot 552 that was generated during prefab region build operations in the prefab factory 502. Deploying the device snapshot 552 can include imaging one or more disk drives or other memories of the replacement server device to bring the replacement server device to the same software configuration as server device 550 in the Prefab Region 530 prior to transportation to the destination site 602. Other devices, including networking devices like switch 534, may be similarly replaced and restored using the captured device snapshots.

The DHCP server 646 can perform test mode validation operations similar to other devices within Prefab Region 530. If DHCP server 646 can successfully validate the network connections between neighboring devices and itself, DHCP server 646 can exit test mode and begin operating as a DHCP server to other devices in the Prefab Region 530. In some embodiments, DHCP server 646 may complete its test mode validation operations prior to other devices in Prefab Region 530 completing their test mode validation operations. For example, server device 536 may boot into test mode and attempt to validate a network connection to DHCP server 646 before validating network connection 542 or network connection 544 between itself and neighboring computing devices. DHCP server 646 may not send a validation indication to server device 536 until DHCP server 646 has completed its own test mode validation operations. Server device 536 can then wait a predetermined amount of time and retry the validation request to DHCP server 646. Similarly, other computing devices performing test mode validation operations may wait and retry validation requests until DHCP server 646 is operational.

As described above, data volumes of the devices in Prefab Region 530 may be encrypted prior to transportation to the destination site 602. The encryption keys used to encrypt the data volumes of each device may be associated with that specific device. The encryption keys 644 may be stored at one of the computing devices in Prefab Region 530 configured to act as a key server for the Prefab Region 530 during initialization (e.g., stored at key server 642). The encryption keys 644 may themselves be encrypted by a master key. In some embodiments, encryption keys 644 may be secured by a hardware security module (e.g., a trusted platform module (TPM)). The hardware security module may be part of key server 642 or may be part of another device connected to key server 642 (e.g., a SmartNIC, an external security device, etc.). In some embodiments, the master key or external security device may be delivered to the destination site 602 separately from the Prefab Region 530 (e.g., by operations personnel) and provided to or installed at the key server 642 as part of the installation operations for Prefab Region 530. Key server 642 may perform test mode validation operations similar to other computing devices in Prefab Region 530. If test mode validation operations complete successfully, key server 642 may begin providing encryption keys 644 to other computing devices in the Prefab Region to decrypt the data volumes. For example, key server 642 may receive a key request from server device 536. In response, key server 642 can decrypt the data volume storing encryption keys 644 (e.g., via a master key, via a hardware security module), retrieve an encryption key corresponding to server device 536, and send the encryption key to server device 536.

Once the Prefab Region 530 has been installed and initialized at destination site 602 (e.g., devices boot into a normal operating mode, data volumes decrypted, services deployed during prefab region build operations at the prefab factory are executing), testing service 616 can perform one or more acceptance tests. An acceptance test can include verifying that all services are functioning as expected. For example, testing service 616 can interact with a service executing at Prefab Region 530 to verify that the service is operating according to the requirements that define the acceptance test. Testing service 616 can provide results of an acceptance test to manager service 612 indicating that Prefab Region build is complete.

During transportation of Prefab Region 530 to destination site 602, updates or other changes may be specified for one or more infrastructure components and/or software resources that had been provisioned at and/or deployed to Prefab Region 530 at the prefab factory. For example, a service may have been updated to a newer version during the transit time. Before the prefab region build operation is complete, orchestration service 618 can deploy updated software resources to Prefab Region 530 at destination site 602. Deploying an updated software resource may occur similar to deployment of software resources to the Prefab Region 530 at the prefab factory.

Figure 7:
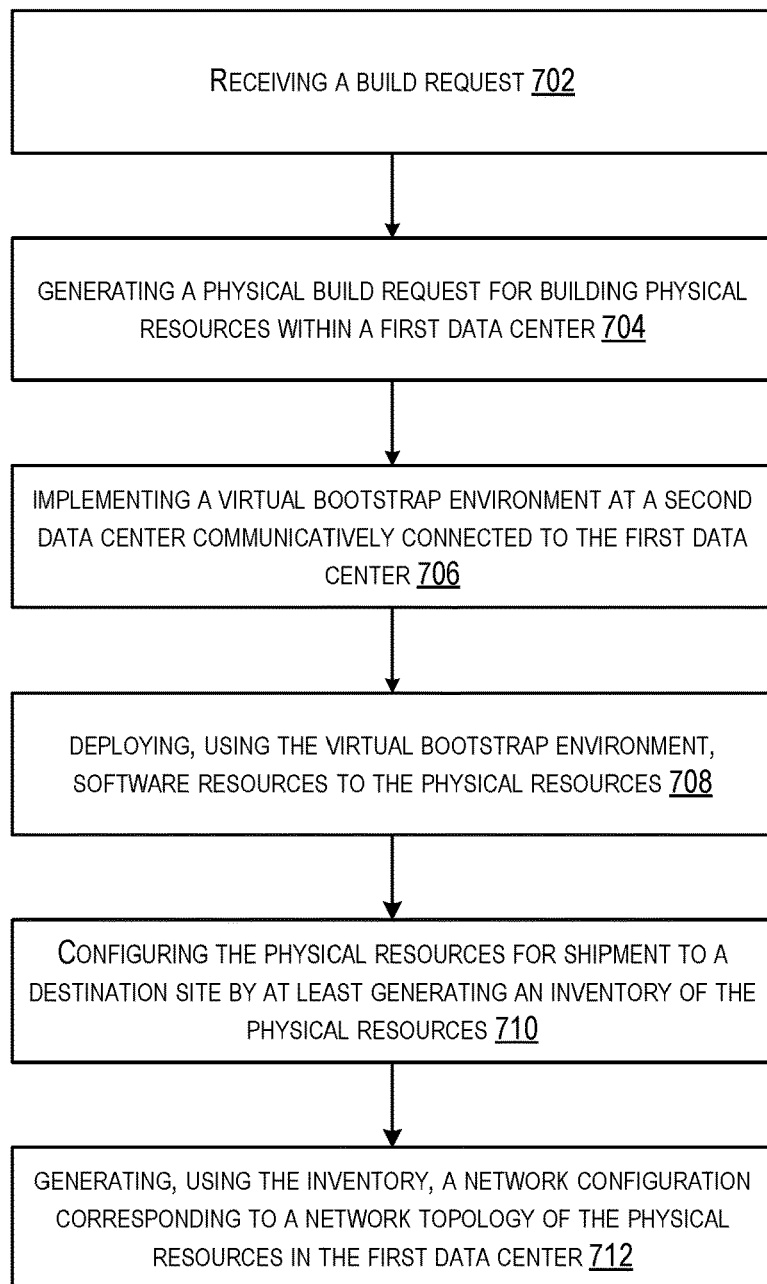
FIG. 7 is an example method for deploying software resources to physical resources of a region being built in a prefab factory and preparing the physical resources for transportation to a destination data center, according to at least one embodiment.

FIG. 7 is an example method for deploying software resources to physical resources of a region being built in a prefab factory and preparing the physical resources for transmission to a destination data center, according to at least one embodiment. The method 700 may be performed by one or more components of a computer system, including one or more components of a computer system of a CSP (e.g., CSP 204 of FIG. 2) that execute a manager service (e.g., manager service 212 of FIG. 2). The operations of method 700 may be performed in any suitable order, and method 700 may include more or fewer operations than those depicted in FIG. 7.

Some or all of the method 700 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The method 700 may begin at block 702 with a manager service receiving a build request. The manager service may be an example of any manager services described herein, including manager service 212 of FIG. 2. The manager service may execute on one or more computing devices of a CSP computer system. The manager service may be one of a plurality of services of the CSP that are configured to perform operations to build a prefab region (e.g., Prefab Region 206 of FIG. 2) in a prefab factory (e.g., prefab factory 202 of FIG. 2). The build request may be a specification or configuration containing information characterizing a prefab region. For example, the build request can include information that defines the size of the prefab region (e.g., the number of computing devices, server racks, etc.), the number and type of services, applications, and other software that will be executed on the computing devices in the prefab region, requirements for computing capabilities (e.g., the number of processors in each computing device, the computing speed of the processors, etc.) in the prefab region, requirements for the types of storage provided in the prefab region, and other similar definitions. In some embodiments, the build request may be provided by operations personnel or system architects that design the prefab regions.

At block 704, the manager service may generate a physical build request for building physical resources within a first data center. The first data center may be a prefab factory (e.g., prefab factory 202 of FIG. 2). The manager service can use information in the build request to generate the physical build request. The physical resources can include server devices, networking devices, and other computing devices that may be used to build a prefab region in the first data center. The physical build request can include information identifying specific physical resources to be built in the first data center. For example, the manager service can interact with an inventory service (e.g., inventory service 214 of FIG. 2) to obtain an inventory of available server devices and server racks in a physical inventory of such devices (e.g., physical inventory 224 of FIG. 2). The manager service can then determine the specific server racks to be used to build the prefab region corresponding to the build request and include that information in the physical build request. The physical build request can also include instructions usable by, for example, operations personnel to retrieve, move, and install the physical resources into the first data center. For example, the instructions can identify specific locations within the first data center to place server racks and instructions for completing specific network connections to the server rack to form the network of the prefab region.

At block 706, the manager service can implement a ViBE (e.g., ViBE 222 of FIG. 2) at a second data center. The second data center can be communicatively connected to the first data center. For example, the manager service may implement the ViBE in a host region of a CSP that is connected to a prefab factory via a network (e.g., network 208 of FIG. 2). The manager service can implement the ViBE in conjunction with an orchestration service (e.g., orchestration service 218 of FIG. 2). For example, the manager service may provide an indication to the orchestration service to build the ViBE, specifying the second data center in which the ViBE is to be constructed. The manager service may implement the ViBE in response to an indication that the physical resources corresponding to the physical build request have been built (e.g., installed, powered on, and functioning normally in the first data center). The indication may be provided by operations personnel after installing the physical resources. In some embodiments, the indication may be provided by the one or more of the physical resources after completing a self-check or other validation of the installation.

At block 708, the manager service can use the ViBE to deploy software resources to the physical resources. The software resources may be associated with cloud services executed on the physical resources. For example, the software resources may be components of a production service (e.g., a database service) that will execute in a prefab region after the prefab region is delivered to a destination site. The manager service can deploy software resources in conjunction with the orchestration service.

At block 710, the manager service can generate an inventory of the physical resources. The manager service may operate in conjunction with the inventory service to generate the inventory. At block 712, the manager service can use the inventory to generate a network configuration corresponding to a network topology of the physical resources in the first data center. The manager service may operate in conjunction with a network service (e.g., network service 220 of FIG. 2) to generate the network configuration. The network configuration may be a network snapshot of the prefab region. The network configuration can include an identifier for a physical resource in the inventory (e.g., a network address for a server device) and information associating the physical resource with neighboring physical resources according to the network topology. For example, the network configuration may identify each computing device and the network connections between the computing device and one or more neighboring computing devices. The operations of block 710 and block 712 may be operations for configuring the physical resources for transmission to a destination site. The destination site may be a third data center. In some embodiments, the manager service may send a portion of the network configuration to the physical resource. The portion of the network configuration can include the identifier corresponding to the physical resource and the information associating the physical resource with the neighboring physical resources in the network topology. In some embodiments, configuring the physical resources for transmission to a destination site can include encrypting, using an encryption key associated with each physical resource, at least a portion of the software resources deployed to each physical resource and storing each encryption key at one of the physical resources (e.g., key server 642 of FIG. 6) designated to host a key service at the second data center.

In some embodiments, the manager service can receive an indication that the physical resources have been delivered to and built (e.g., installed) at the destination site. In response to the indication, the manager service can validate the topology of the physical resources at the destination site. For example, the manager service, in conjunction with the network service, may obtain a network configuration of the physical resources at the destination site and compare the network configuration to information included in a stored network snapshot that was obtained before the physical resources were shipped to the destination site. If the network topology of the physical resources at the destination site is validated, the manager service may deploy one or more updated software resources to the physical resources. For example, the manager service may operate with the orchestration service to deploy updated software components for a service that was deployed in the prefab region at the prefab factory but which were moved to a newer version during transit of the physical resources to the destination site.

In some embodiments, the manager service can perform operations to support the initialization of the physical resources at the destination site. The manager service can determine a dependency of a first cloud service (e.g., a deployed application) on a second cloud service (e.g., a database service). The first cloud service can include software resources hosted on a first physical resource while the second cloud service can include software resources hosted on a second physical resource of the physical resources. Because of the dependency, the first cloud service may not function correctly until the second cloud service is operating normally. Since the physical resources can perform test mode validations independently during initialization, portions of the deployed region may become available before others. In this case, the manager service can determine whether a portion of the network topology associated with the second physical resource was validated successfully and then send an indication that the first cloud service is available. The indication may be sent to an operations console or other system that configured to report the availability of services and applications in the prefab region at the destination site as they become available. For example, the indication may beused to initiate one or more user acceptance tests on the newly available first cloud service.

In some embodiments, during prefab region build operations at the prefab factory, changes may be made to the configuration of the prefab region. For example, a prefab region may need to have additional computing resources to support additional or expanded applications and/or services once delivered to the destination site. The techniques described herein can address modifications to a prefab region while it is being built in the prefab factory. The manager service can generate an updated physical build request that can be used to modify the physical resources. For example, the updated physical build request can specify the installation of an additional server rack into the prefab region at the prefab factory. As another example, one or more server devices may be replaced with a different type of server device (e.g., a device with a faster processor, additional processors, additional memory, etc.). As with the physical build request, the updated physical build request can include instructions usable to obtain, install, and/or modify the physical resources, for example by operations personnel at the prefab factory. After the modifications have been made, the manager service can deploy updated software resources to the modified physical resources. For example, the manager service can use the orchestration service and the ViBE to deploy software components of a new service to a new server rack in the prefab region. The manager service may deploy the updated software resources in response to receiving an indication that the physical resources were successfully modified.

In some embodiments, configuring the physical resources for transportation to the second data center can include generating device snapshots for one or more of the physical resources. For example, the manager service can generate a software image of each server device in the prefab region and store the software images in a datastore or similar repository. When validating the prefab region after installation at the destination site, the manger service can determine that one of the physical resources has failed. For example, a server device may have been damaged or lost during shipment to the destination site. In response, the manager service can generate instructions usable to replace the non-functional physical resource with a functional replacement (e.g., swap a non-working server device with a working replacement server device with identical physical configuration). Once the functional replacement device has been installed, the manager service can configure the replacement device using the device snapshot of the failed device. For example, the manager service can deploy an image to the replacement device to create a device that is configured and functions the same as the device that was replaced.

Figure 8:
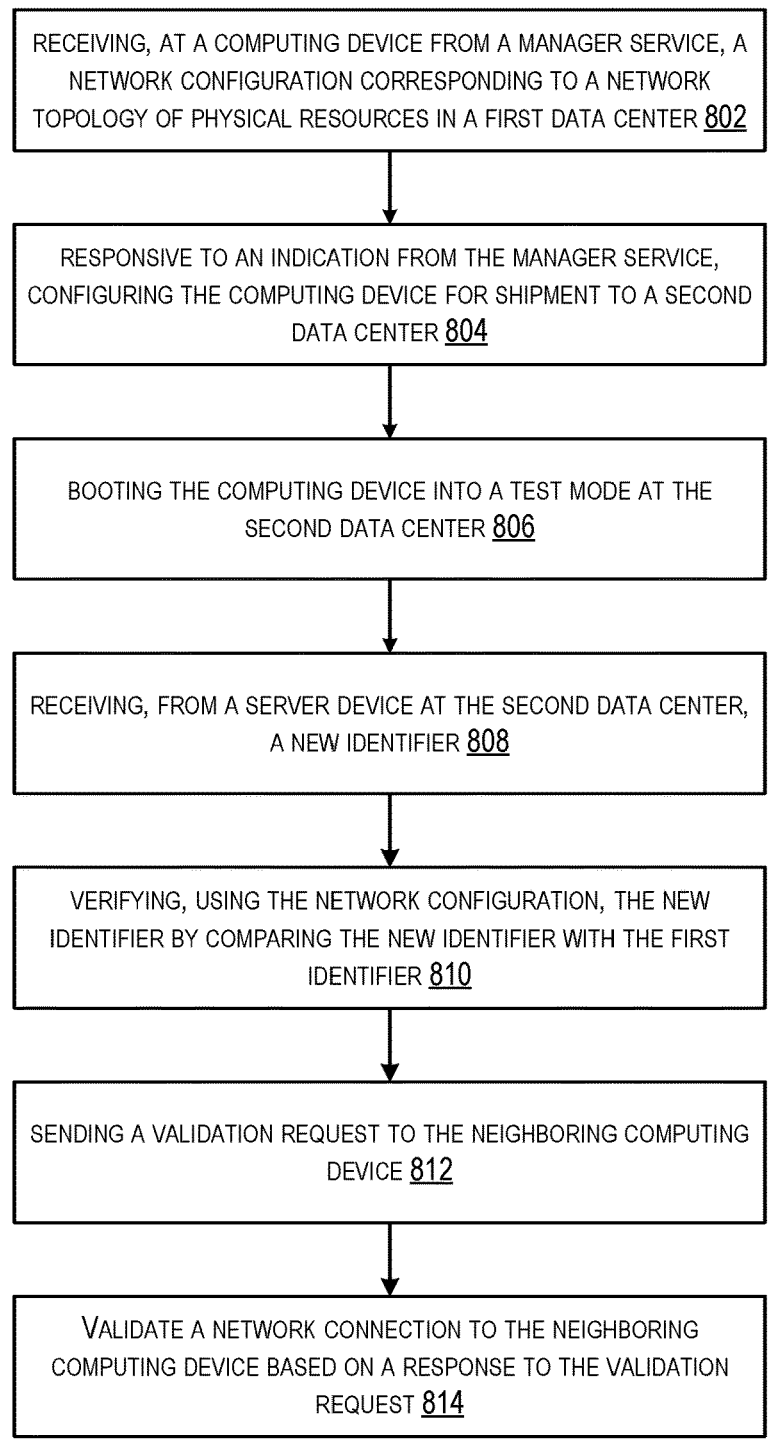
FIG. 8 is an example method for booting physical resources built at a prefab factory after delivery to a destination data center and verifying a network configuration of the physical resources, according to at least one embodiment.

FIG. 8 is an example method 800 for booting physical resources built at a prefab factory after delivery to a destination data center and verifying a network configuration of the physical resources, according to at least one embodiment. The method 800 may be performed by one or more components of a computer system, including one or more components of a computer system of a prefab region (e.g., Prefab Region 206 of FIG. 2) that are communicatively connected to a CSP hosting a manager service (e.g., manager service 212 of FIG. 2). For example, the method 800 may be performed by a computing device of a prefab region, including server device 536 of FIG. 5, DHCP server 646, or key server 642 of FIG. 6. The operations of method 800 may be performed in any suitable order, and method 800 may include more or fewer operations than those depicted in FIG. 8.

Method 800 may begin at block 802 with the computing device receiving a network configuration (e.g., network snapshot 526 of FIG. 5) from the manager service. The network configuration can include information specifying a network topology of physical resources in a first data center (e.g., prefab factory 202 of FIG. 2). The network configuration can include a firstidentifier (e.g., network address, hostname, etc.) associated with the computing device, a second identifier (e.g., network address, hostname, etc.) associated with a neighboring computing device, and information associating the computing device with the neighboring computing device (e.g., information specifying network connection 544 of FIG. 5). The computing device can be configured to use the network configuration to communicate over a network connection with the neighboring computing device.

At block 804, the computing device can be configured for transmission to a second data center (e.g., destination site 602 of FIG. 6). Configuring the computing device for transmission can include operations similar to those described above for blocks 710 and 712 of FIG. 7. Additionally, configuring the computing device for transmission to the second data center can include configuring the computing device to boot into a test mode during a subsequent power on sequence. At block 806, the computing device may be booted into the test mode at the second data center. For example, once the computing device and other physical resources of the prefab region have been delivered to and installed at the second data center, the computing device may be powered on and enter the test mode. In some embodiments, booting the computing device into the test mode can include booting from a boot volume stored on a SmartNIC connected to the computing device.

At block 808 the computing device can receive a new identifier. The new identifier can be received from a server device at the second data center. For example, the server device can be a device configured to act as a DHCP server at the second data center. The identifier may be a network address for the computing device. As described above, the identifier may be the same as the first identifier associated with the computing device in the prefab region at the prefab factory, since no changes to the network configuration should have occurred during transit and installation of the physical resources at the second data center.

At block 810, the computing device can verify the new identifier by comparing the new identifier with the first identifier. The computing device can obtain the first identifier from the network configuration stored at the computing device prior to transmission.

At block 812, the computing device can send a validation request to the neighboring computing device. The validation request sent according to the second identifier associated with the neighboring computing device. For example, the computing device can ping the neighboring device at a network address associated with the neighboring computing device. In response, at block 814, the computing device can validate a network connection to the neighboring computing device. The network connection can be characterized by the network configuration. In some embodiments, the validation of the network connection can include receiving a response to the validation request, which may be a validation indication from the neighboring computing device. In some embodiments, the response to the validation request may be an indication that validation request was not received by the neighboring computing device, for example a request time out indication. The validation indication can indicate that the physical networking between the computing device and the neighboring computing device has been installed correctly at the second data center. In some embodiments, once the computing device successfully validates its connection to each neighboring computing device, the computing device can send an indication to the manager service that the network connections associated with the computing device were successfully validated at the destination site.

In some embodiments, the computing device may be configured to operate as a key server in the prefab region at the second data center. Configuring the computing device for transmission to a second data center can then include encrypting a data volume of the neighboring computing device using an encryption key associated with the neighboring computing device. The encryption key may be stored at a data volume of the computing device, which can in turn be encrypted with a different encryption key (e.g., a master key). The master key may then be stored at a secure storage volume (e.g., hardware security module, trusted platform module (TPM), SmartNIC) that is connected to the computing device and that can be used to decrypt the storage volume on the computing device to retrieve and vend encryption keys to the neighboring computing device and other computing devices in the prefab region as they come online in the second data center. In some embodiments, once the computing device validates the network connection to the neighboring computing device, the computing device can obtain the master key from the secure storage volume, decrypt the data volume storing the encryption keys, and vend the encryption keys in response to key requests from the neighboring computing device or other computing devices.

In some embodiments, the computing system can determine that one or more of the computing devices at the second data center has failed or is otherwise not functioning correctly. For example, a server device of a server rack may have been damaged during transportation. To complete the installation of the prefab region at the second data center, the failed or otherwise non-functional computing device can be replaced with another device and configured with a software image of the failed device prior to the transportation of the devices to the second data center. As one example, the computing system can configure the neighboring computing device for transmission to the second data center by generating a device snapshot of the neighboring computing device. The device snapshot can include a software image of the neighboring computing device. The device snapshot may be generated by the manager service and/or other prefab services performing prefab region build operations at the prefab factory.

Once the computing devices are installed at the second data center, the computing system can determine that the neighboring computing device is non-functional. For example, the computing device can receive a response to the validation request that indicates that the neighboring computing device has been damaged or is not functioning properly. In response to this determination, the manager service can generate instructions to replace the neighboring computing device with a replacement computing device. The instructions may be usable by personnel at the second data center to make the replacement (e.g., a like-for-like swap of the device on a server rack). The manager service can then deploy the device snapshot for the neighboring computing device to the functional neighboring computing device, resulting in a device that can be identical to the failed device. The computing device can then re-send the validation request to determine the correct operation of the network connection between the computing device and the neighboring computing device.

Mobile Prefabrication Factory

The embodiments described above include prefab region build operations in a prefab factory that is built at a suitable location to support both the logistics of handling (e.g., receiving, moving, shipping, installing, etc.) the physical resources (e.g., computing devices, networking devices, computing devices built into server racks, etc.) into and out from the prefab factory to build a region and the computational and networking requirements of infrastructure provisioning and deployment onto the computing devices in the prefab factory. The prefab region build operations in the central prefab factory provide numerous advantages with respect to conventional techniques to build a data center at a destination site and then provision, configure, and deploy resources therein. Additional advantages with a prefab factory can be realized according to techniques for performing prefab region build operations in a mobile prefab factory. A mobile prefab factory can include a system similar to a prefab factory having one or more server racks connected to a network fabric and one or more computing devices that can perform operations to provision and deploy resources to the server racks while the system is in transit to a destination site. By performing prefab region build operations in a mobile prefab factory, certain prefab regions can finish being built just as the prefab region computing devices arrive at a destination site. Moreover, performing prefab region build operations in a mobile prefab factory frees computing resources supporting the prefab factory operations.

As a particular example of a mobile prefab factory, a customer of a CSP may desire cloud computing resources (e.g., cloud services, computing resources, storage resources) as from a region data center but located on-premises at a customer location. For example, a customer may desire a small-scale region providing one or more services to be installed at a customer facility. Since the scale of the data center of the small-scale region is small, the computing devices may be installed in the mobile prefab factory instead of at the prefab factory and shipped to the customer site. The prefab region build operations can then be formed in transit, allowing larger scale prefab region builds to take place at the prefab factory. Once the mobile prefab factory arrives at the customer site, the computing devices can be connected to a network at the destination data center site and be ready for acceptance checks and/or other tests to bring the services in the prefab region device to a production state.

A mobile prefab factory can be used to perform some, any, or all of the operations associated with a prefab region build that would be performed in a prefab factory as described above. For example, server racks can be installed in the mobile prefab factory according to a physical build request generated by a manager service. The mobile prefab factory can have a static network fabric and related networking infrastructure to connect the server racks to form a region network. The server racks and the devices thereon can then be provisioned during transit from a bootstrapping environment configured on one or more computing devices in the mobile prefab factory. In another example, the server racks may be installed first at the prefab factory according to a physical build request, the computing devices thereon partially provisioned in the prefab factory, and then the server racks moved to the mobile prefab factory. The computing devices of the server racks can then be fully provisioned in transit.

Figure 9:
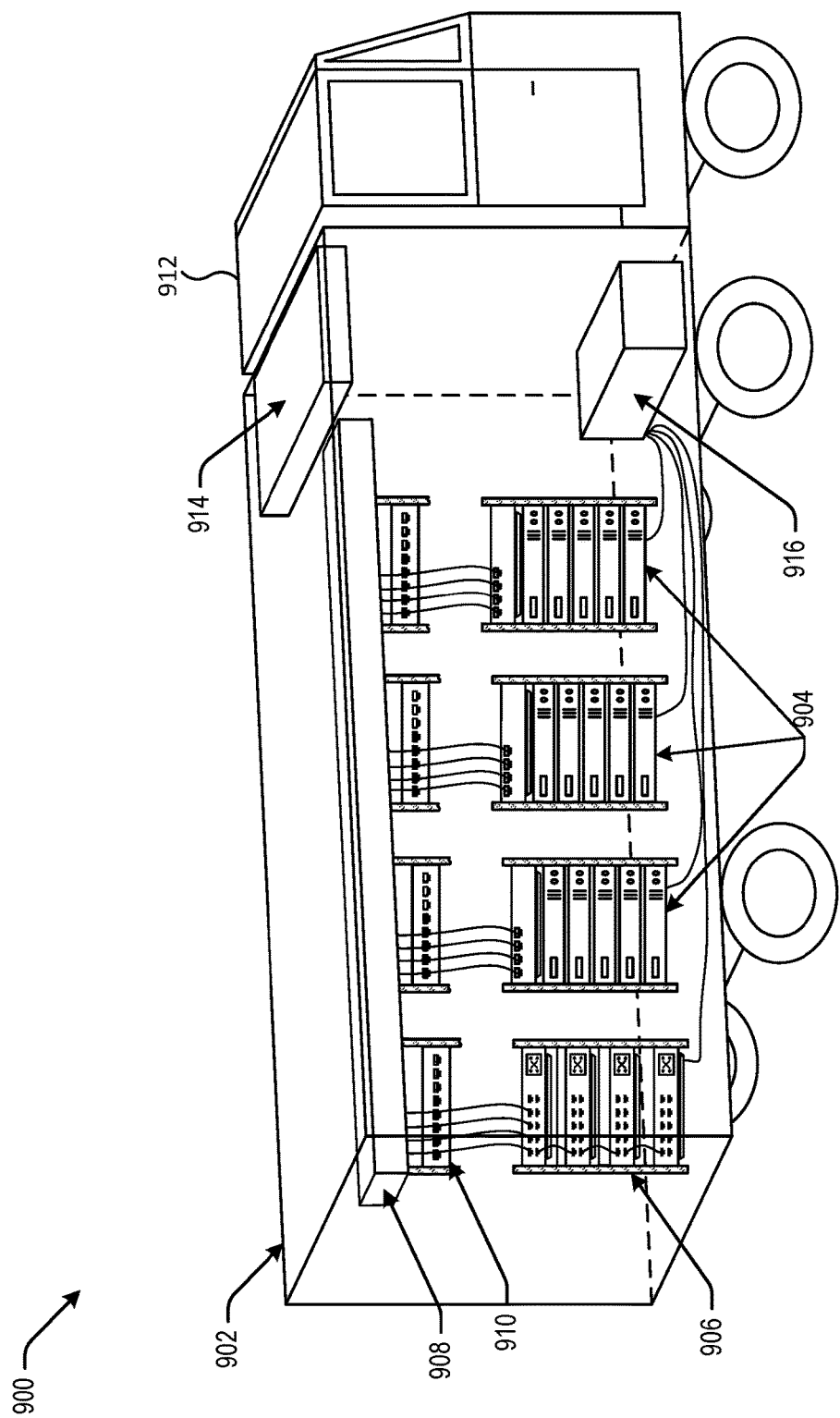
FIG. 9 is a diagram illustrating a mobile prefab factory, according to at least one embodiment.

FIG. 9 is a diagram illustrating a mobile prefab factory 900, according to at least one embodiment. The mobile prefab factory can include a containment enclosure 902 that is configured to be loaded on or otherwise connected to a vehicle 912 (e.g., a truck, an aircraft, etc.). The vehicle 912 can be configured to transport the containment enclosure 902 to a destination site. In some embodiments, the containment enclosure 902 can be a shipping container that has been modified to support prefab region build components (e.g., networking infrastructure, network cables, power supplies, etc.). In other embodiments, the containment enclosure 902 can be an integral portion of the vehicle 912, for example, an area of an aircraft fuselage partitioned by bulkheads to create an enclosed room for the physical resources of the prefab region.

The containment enclosure 902 can be configured to allow for the installation of one or more server racks 904, networking infrastructure 906 (e.g., network switches to provide network connections for computing devices of the server racks 904), network cables 908 (e.g., installed in an overhead cable tray as depicted in FIG. 9). The containment enclosure 902 can including mount points for bolting or securing the server racks 904 to the floor at locations in the enclosure. The networking infrastructure 906 can include one or more networking devices including switches (e.g., aggregate switches, spine and leaf switches), routers, and other devices that can form a static network fabric in the containment enclosure 902 in conjunction with the network cables 908. The static network fabric may be similar to the static network fabric 900 described above with respect to FIG. 9. For example, the networking infrastructure 906 and network cables 908 may form a Clos network when connected to one or more computing devices of server racks 904.

The containment enclosure 902 can also include a power supply 916. The power supply 916 can be an electric generator (e.g., diesel electric generator), a battery system, and/or a combination of a generator and battery system. The power supply 916 can be configured to supply sufficient power to the server racks 904, networking infrastructure 906, and other devices used to form the prefab region while in the containment enclosure 902. In some embodiments, the power supply 916 can be connected to an engine, motor, or other power generating system of the vehicle 912, such that the vehicle engine can provide primary and/or auxiliary electrical power to the devices in the prefab region. For example, the power supply 916 may be a diesel electric generator with a battery system, where the battery system is also connected to an electric generator (e.g., engine alternator) of the vehicle 912. If the diesel electric generator fails or is otherwise interrupted, the electric generator of vehicle 912 can supply auxiliary power to the battery system while the battery system provides uninterrupted power to the computing devices.

In some embodiments, the containment enclosure 902 can include a cooling system 914. The cooling system 914 can be a refrigeration unit (e.g., a diesel powered refrigeration system). The cooling system 914 can have its own power supply (e.g., a separate diesel electric generator) or may be connected to the power supply 916. The cooling system 914 can be configured to maintain the interior of the containment enclosure 902 at an ambient operating temperature (e.g., 60° F.). Although not depicted in FIG. 9, the cooling system 914 can also include ventilation system (e.g., fans, blowers, air ducts, etc.) to circulate air within the containment enclosure 902, including, for example, venting hot exhaust air from the server racks 904 to the exterior of the containment enclosure 902, drawing in air from the exterior of the containment enclosure 902, and directing cold air from a heat exchanger of the cooling system 914 to the locations of the server racks 904.

The vehicle 912 can be any suitable vehicle for moving a containment enclosure 902 holding server racks 904, networking infrastructure 906, and other devices that form the prefab region while in transit. For example, the vehicle 912 can be a tractor truck configured to pull a semi-trailer used as a containment enclosure 902. In another example, the vehicle 912 may be an aircraft with a portion of the fuselage used as a containment enclosure 902. As a third example, the vehicle 912 can be a ship configured to carry a shipping container as a containment enclosure 902 enclosure. The vehicle 912 may be configured to provide power to the containment enclosure 902. For example, the power supply 916 can be a component of the vehicle 912 (e.g., an engine or motor of the vehicle) rather than a separate component of the containment enclosure 902.

In some embodiments, the containment enclosure can include one or more cable termination protection apparatuses (CTPAs) 910 installed above locations for the server racks 904. The CTPAs 910 can be configured as described in related U.S. Non-Provisional application Ser. No. 18/122,678, entitled "Techniques for a Cable Termination Protection Apparatus in a Prefab Factory," the contents of which are hereby incorporated by reference in their entirety for all purposes.

Figure 10:
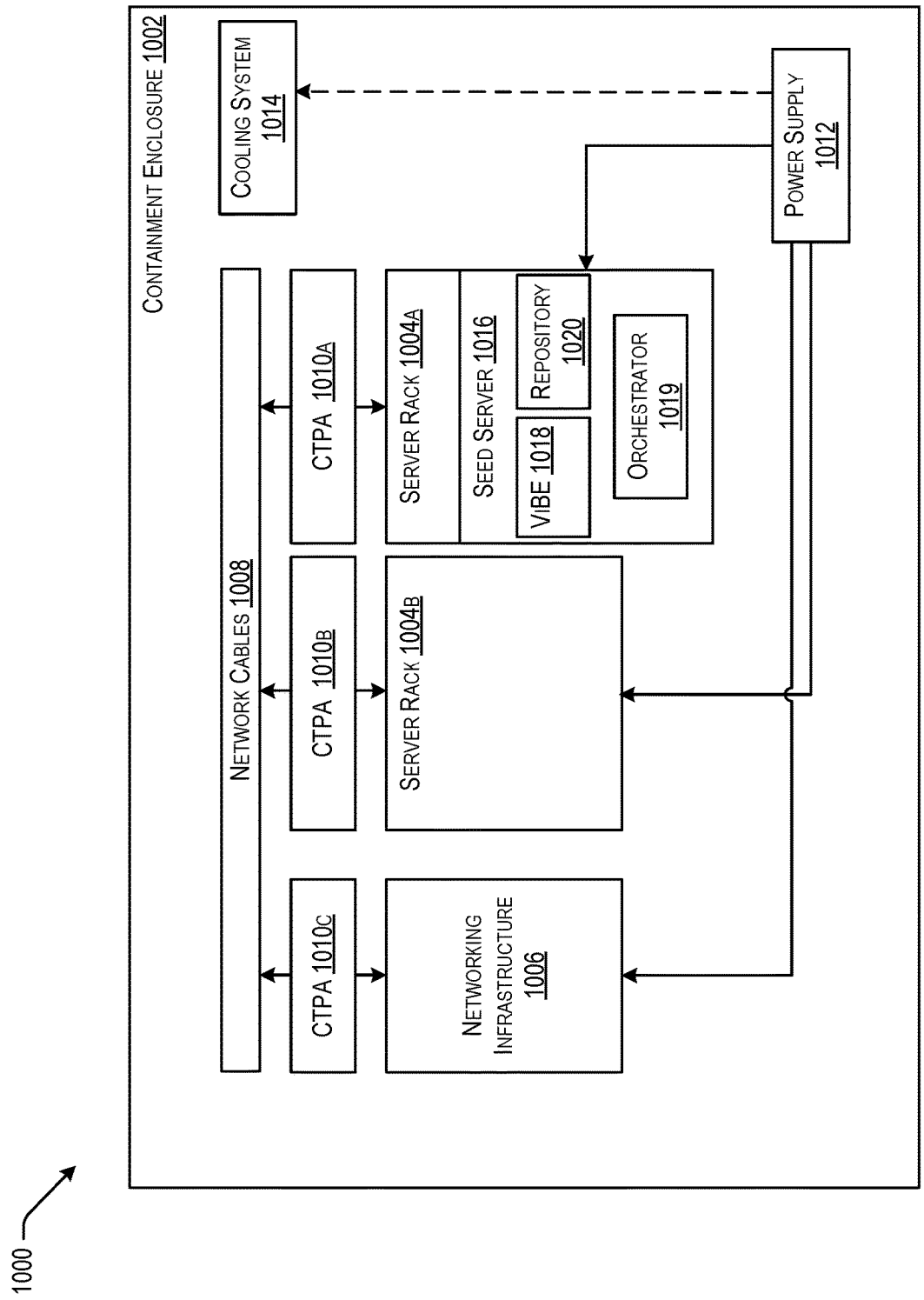
FIG. 10 is a block diagram illustrating a containment enclosure for computing devices within a mobile prefab factory, according to at least one embodiment.

FIG. 10 is a block diagram illustrating a containment enclosure 1002 for computing devices of a prefab region within a mobile prefab factory 1000, according to at least one embodiment. Containment enclosure 1002 may be an example of containment enclosure 902 described above in FIG. 9. Similarly, mobile prefab factory 1000 may be an example of mobile prefab factory 900 of FIG. 9.

Containment enclosure 1002 can include server racks 1004A and 1004B and networking infrastructure 1006. The server racks 1004A and 1004B can include one or more computing devices (e.g., server devices, top of rack switch, etc.) that are communicatively connected to the networking infrastructure 1006 via one or more network cables 1008. The network cables 1008 can be configured to terminate at locations within the containment enclosure 1002 at which the networking infrastructure 1006 and server racks 1004A and 1004B can be positioned and installed. At each location, CTPAs 1010A-1610C can be positioned to provide a connection port for the network cables 1008 when the networking infrastructure 1006 and server racks 1004A and 1004B are not connected to form the region network (e.g., during loading and unloading operations of the containment enclosure 1002 at the beginning/end of transit). The power supply 1012 may be electrically connected to each computing device or other device in the containment enclosure that requires electric power. In some examples, the rack containing networking infrastructure 1006 and the server racks 1004A and 1004B can have power distribution systems installed on the racks, so that the power supply 1012 can be connected to a single point of the power distribution system, which then provides electric power to the individual computing devices on the rack.

During prefab region build operations in the mobile prefab factory 1000, one or more of the computing devices can be configured to host a seed server 1016. The seed server 1016 can be an example of a bootstrapping environment described above with respect to FIG. 2. During installation of the server racks 1004A and 1004B, prior to the mobile prefab factory 1000 beginning its transit to a destination site, the computing devices of server racks 1004A and 1004B can be communicatively connected to a computing system of a CSP hosting one or more prefab services (e.g., prefab services 210 of FIG. 2), including a manager service (e.g., manager service 212 of FIG. 2). The manager service can configure the seed server 1016 to have a ViBE 1018. The ViBE 1018 may be similar to other ViBEs described herein, including ViBE 222 of FIG. 2. The manager service can also configure the seed server 1016 to include an orchestrator 1019. The orchestrator 1019 can be configured to perform operations for provisioning infrastructure components on the computing devices of server racks 1004A and 1004B and deploying, using the ViBE 1018, software resources to the provisioned infrastructure components.

In some embodiments, the manager service can also implement a software repository 1020 at the seed server 1016. The software repository 1020 can store a complete set of software resources to be used when performing prefab region build operations. For example, the software repository 1020 can store software images of configurations, compiled program code, operating systems, and other software resources to be deployed to the computing devices of server racks 1004A and 1004B. The orchestrator 1019 can use the software repository 1020 to maintain the ViBE 1018 during prefab region build operations, including deploying services into the VIBE 1018 to support prefab region build operations.

Figure 11:
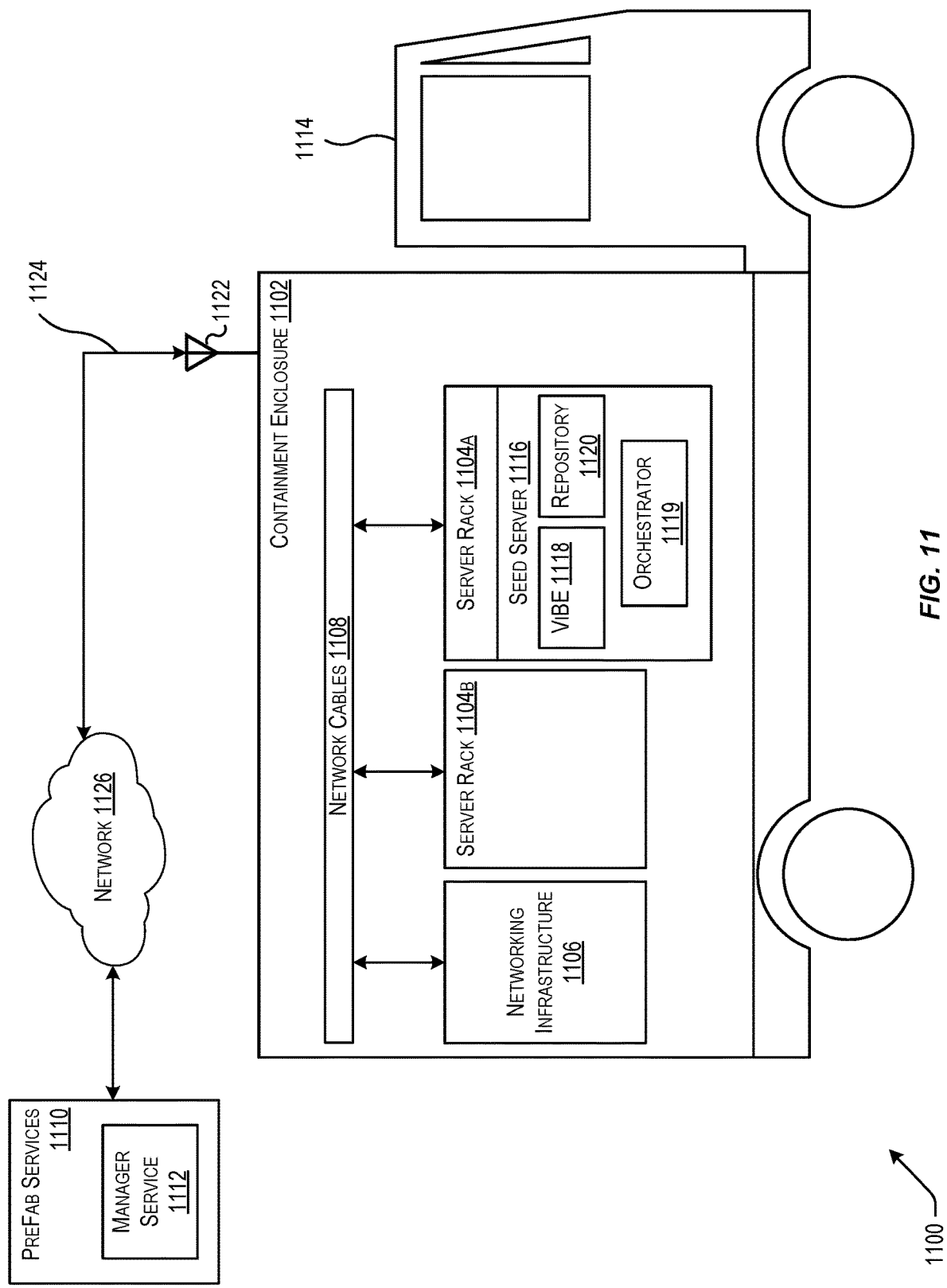
FIG. 11 is a diagram illustrating a mobile prefab factory that can connect to cloud services while in transit and receive updated software resources, according to at least one embodiment.

FIG. 11 is a diagram illustrating a mobile prefab factory 1100 that can connect to cloud services while in transit and receive updated software resources, according to at least one embodiment. The mobile prefab factory 1100 can be an example of mobile prefab factory 1000 of FIG. 10. Similarly, server racks 1104A and 1104B and networking infrastructure 1106 may be examples of server racks 1004A and 1004B and networking infrastructure 1006 of FIG. 10.

As shown in FIG. 11, the containment enclosure 1102 can include a wireless network system 1122 that can be configured to connect to a computing system of a CSP hosting prefab service 1110 via network 1126. For example, the wireless network system 1122 may be a cellular antenna to connect to a cellular network. As another example, the wireless network system 1122 may be a satellite antenna. The wireless network system 1122 can be used to establish a network connection 1124 to network 1126 and the prefab services 1110.

Once the network connection 1124 has been established, a manager service 1112 of the prefab services 1110 can send updated software resources to the seed server 1116. For example, during transit of the vehicle 1114 to the destination site, an application to be deployed to the physical resources of the prefab region may have received an update to a new version. Instead of waiting until the prefab region is installed at the destination site to deploy the updated resource, the manager service can send the updated software resources to the seed server 1116 while the vehicle 1114 is in transit. The orchestrator 1019 can then deploy the updated software resource to the physical resources in the prefab region.

Figure 12:
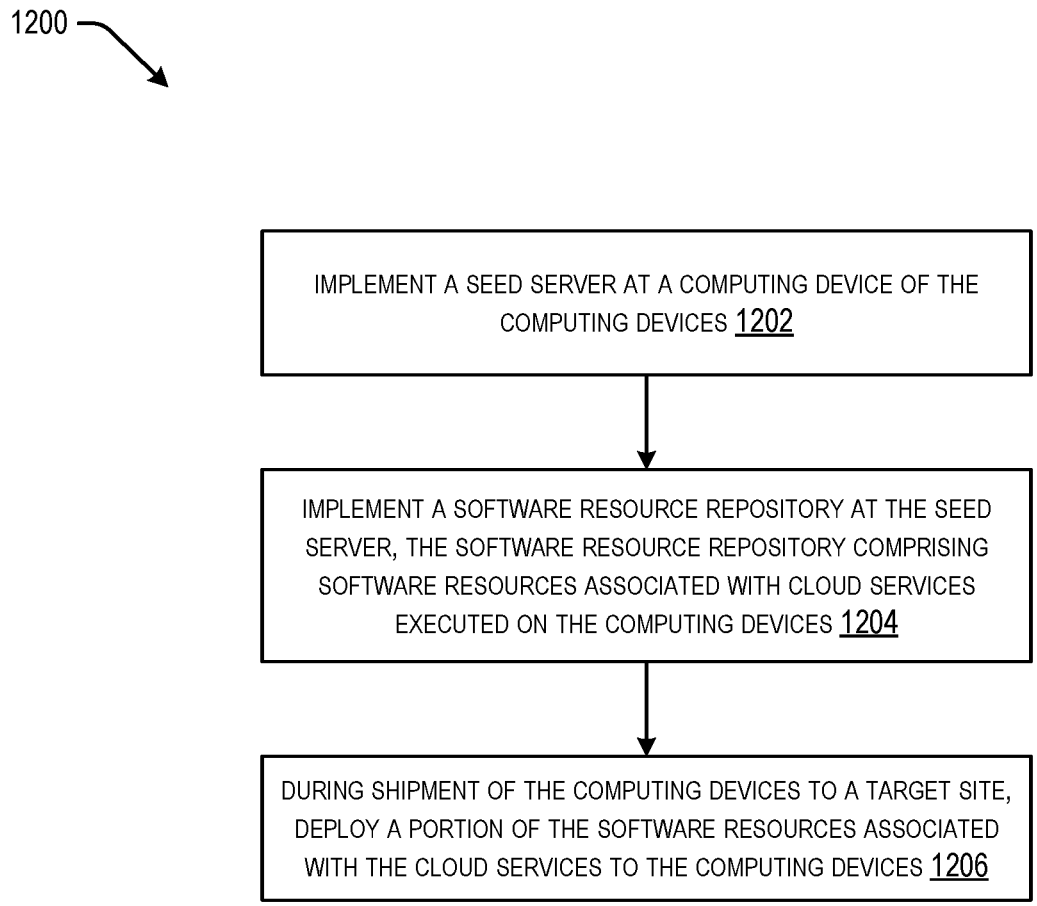
FIG. 12 is an example method for deploying software resources to computing devices of a region in a mobile prefab factory during transit, according to at least one embodiment.

FIG. 12 is an example method 1200 for deploying software resources to computing devices of a region in a mobile prefab factory during transit, according to at least one embodiment. The method 1200 may be performed by a computing device located within a containment enclosure (e.g., containment enclosure 1102 of FIG. 11), including a server device of a first data center. The first data center may be the prefab region as installed in a mobile prefab factory (e.g., mobile prefab factory 1100 of FIG. 11), including one or more server racks (e.g., server racks 1104A and 1104B) that can be communicatively connected to form a prefab region network when connected with networking infrastructure (e.g., networking infrastructure 1106). The first data center may be communicatively connected to a second data center (e.g., a host region) prior to the mobile prefab factory beginning its transit to a destination site.

The method 1200 may begin at block 1202 with a manager service of a second data center implementing a seed server at a computing device installed in the mobile prefab factory. The computing device can be one or more of the server devices of the prefab region. The seed server may be configured to coordinate provisioning and deployment operations for prefab region build for the other computing devices installed in the mobile prefab factory.

At block 1204, the manager service can implement a software resource repository at the seed server. The software resource repository may be an example of software repository 1120 described above with respect to FIG. 11. The software resource repository can include software resources associated with cloud services executed on the computing devices of the first data center, for example after the first data center is delivered to and installed at a destination site.

At block 1206, while the mobile prefab factory is in transit to a target site (e.g., a destination site, a customer facility, a data center facility), the seed server can deploy a portion of the software resources stored in the software repository to the computing devices. The portion of the software resources may correspond to an instance of a cloud service that can be executed on the computing devices of the first data center.

In some embodiments, during transmission of the computing devices to the target site, a network connection can be established between the computing devices and the manager service. For example, the network connection may be a cellular network connection over a public internet. The seed server can then receive an updated software resource from the manager service and store the updated software resource in the software resource repository. The seed server can deploy the updated software resource to the computing devices as part of prefab region build operations. For example, the updated software resource may be an update to an application deployed to the computing devices during transit. The seed server can then deploy the updated application to the computing devices prior to the computing devices being delivered to the destination site (e.g., while the mobile prefab factory is still in transit). In some embodiments, instead of sending the updated software resource to the seed server, the manager service of the second data center may deploy the updated software resource to the computing devices directly.

In some embodiments, the seed server can determine that the duration for deploying the software resources will exceed the transmission duration. The prefab region build operations may be paused to allow for removal of the server racks from the mobile prefab factory and installation of the server racks at the target site. The seed server can configure the computing devices to resume deployment of the software resources after the computing devices are installed at the target site. The seed server can store status information corresponding to the state of deployment of the software resources. After the computing devices are installed at the target site, a network connection can be established between the computing devices of the first data center and the second data center. The seed server can send the status information to the manager service of the second data center. The manager service can use the status information to deploy additional software resources to the computing devices.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 13:
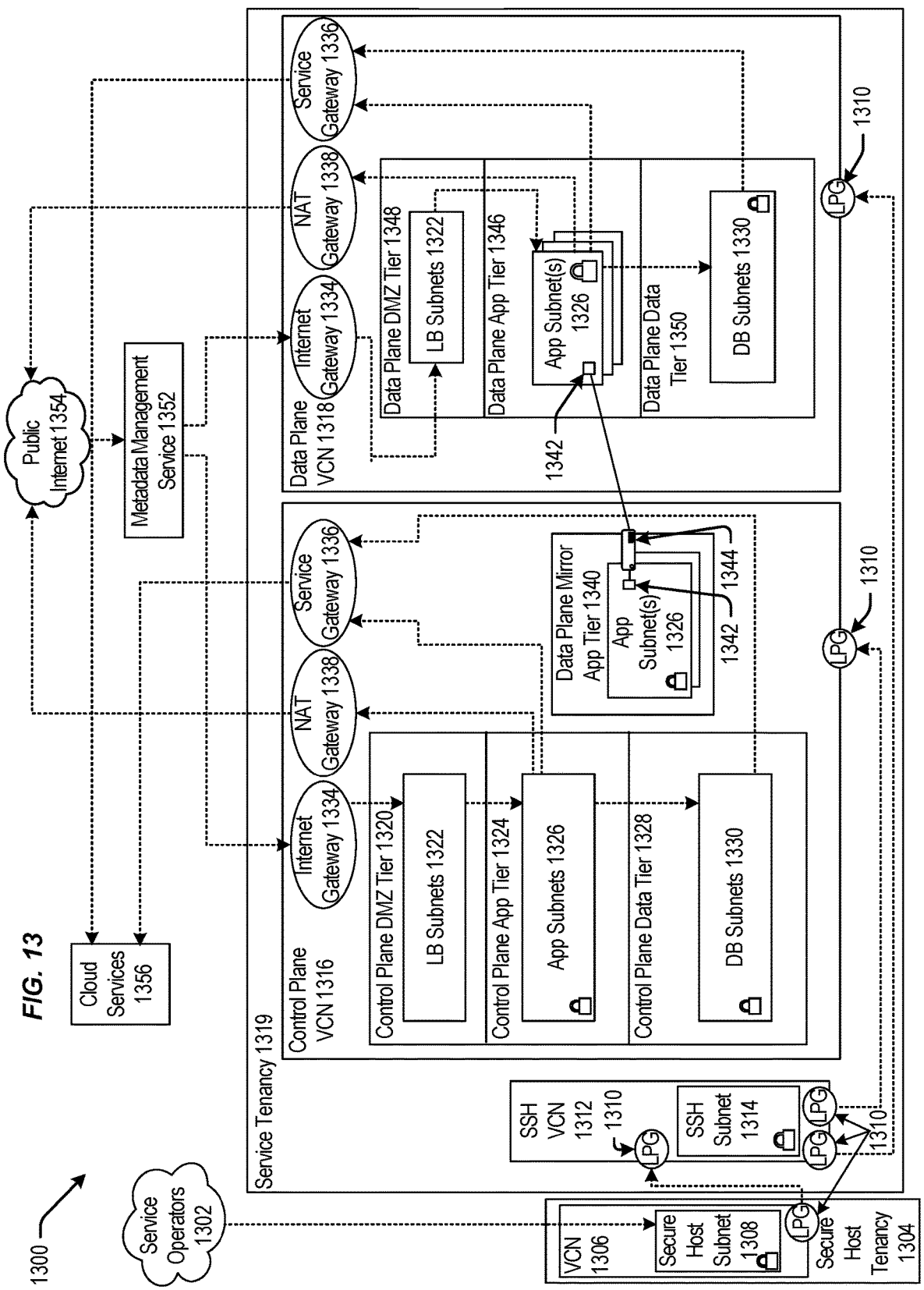
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, Black Berry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
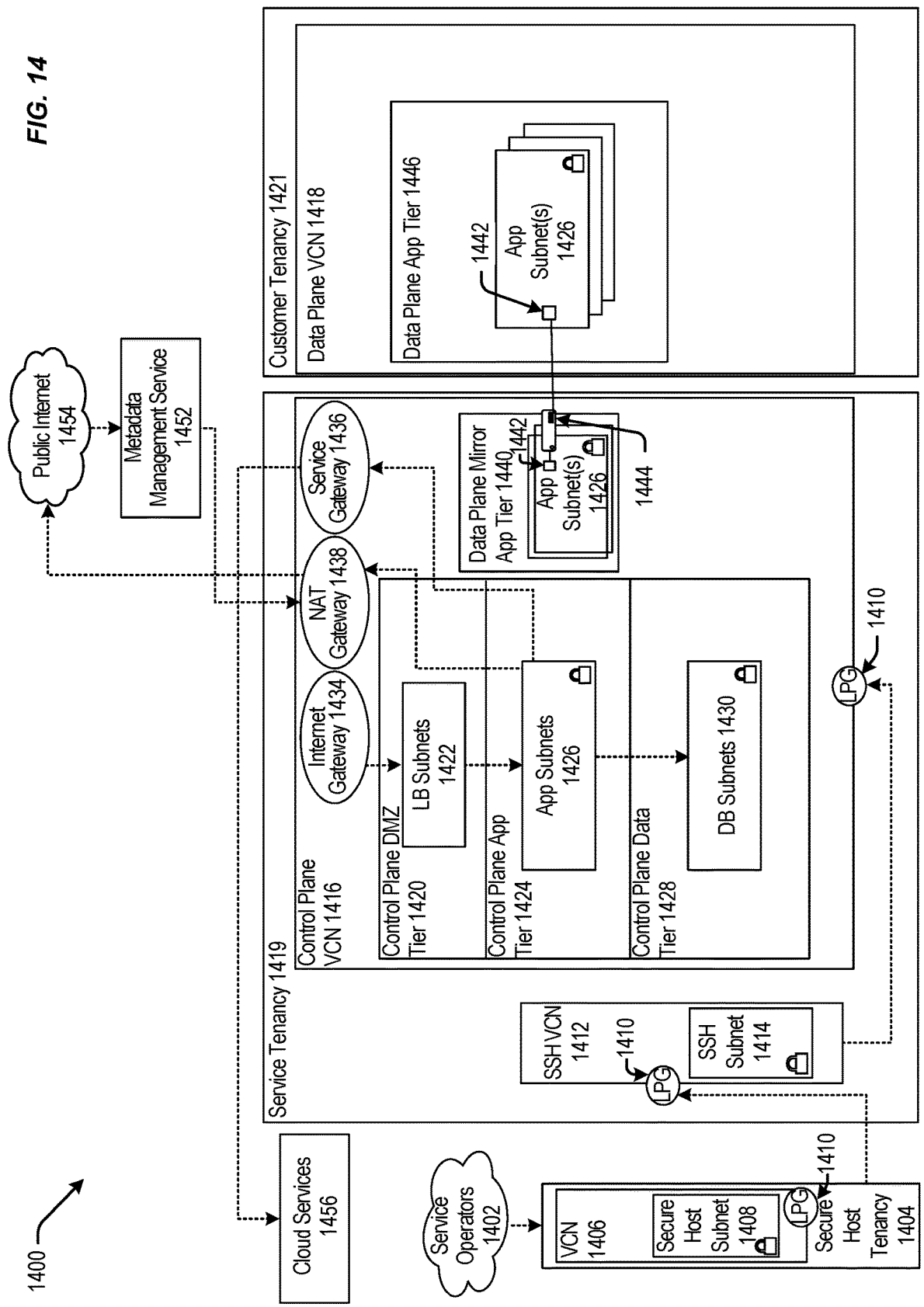
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1302 of FIG. 13) can be communicatively coupled to a secure host tenancy 1404 (e.g., the secure host tenancy 1304 of FIG. 13) that can include a virtual cloud network (VCN) 1406 (e.g., the VCN 1306 of FIG. 13) and a secure host subnet 1408 (e.g., the secure host subnet 1308 of FIG. 13). The VCN 1406 can include a local peering gateway (LPG) 1410 (e.g., the LPG 1310 of FIG. 13) that can be communicatively coupled to a secure shell (SSH) VCN 1412 (e.g., the SSH VCN 1312 of FIG. 13) via an LPG 1310 contained in the SSH VCN 1412. The SSH VCN 1412 can include an SSH subnet 1414 (e.g., the SSH subnet 1314 of FIG. 13), and the SSH VCN 1412 can be communicatively coupled to a control plane VCN 1416 (e.g., the control plane VCN 1316 of FIG. 13) via an LPG 1410 contained in the control plane VCN 1416. The control plane VCN 1416 can be contained in a service tenancy 1419 (e.g., the service tenancy 1319 of FIG. 13), and the data plane VCN 1418 (e.g., the data plane VCN 1318 of FIG. 13) can be contained in a customer tenancy 1421 that may be owned or operated by users, or customers, of the system.

The control plane VCN 1416 can include a control plane DMZ tier 1420 (e.g., the control plane DMZ tier 1320 of FIG. 13) that can include LB subnet(s) 1422 (e.g., LB subnet(s) 1322 of FIG. 13), a control plane app tier 1424 (e.g., the control plane app tier 1324 of FIG. 13) that can include app subnet(s) 1426 (e.g., app subnet(s) 1326 of FIG. 13), a control plane data tier 1428 (e.g., the control plane data tier 1328 of FIG. 13) that can include database (DB) subnet(s) 1430 (e.g., similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g., the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g., the service gateway of FIG. 13) and a network address translation (NAT) gateway 1438 (e.g., the NAT gateway 1338 of FIG. 13). The control plane VCN 1416 can include the service gateway 1436 and the NAT gateway 1438.

The control plane VCN 1416 can include a data plane mirror app tier 1440 (e.g., the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g., the VNIC of 1342) that can execute a compute instance 1444 (e.g., similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g., the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g., the metadata management service 1352 of FIG. 13) that can be communicatively coupled to public Internet 1454 (e.g., public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g., cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
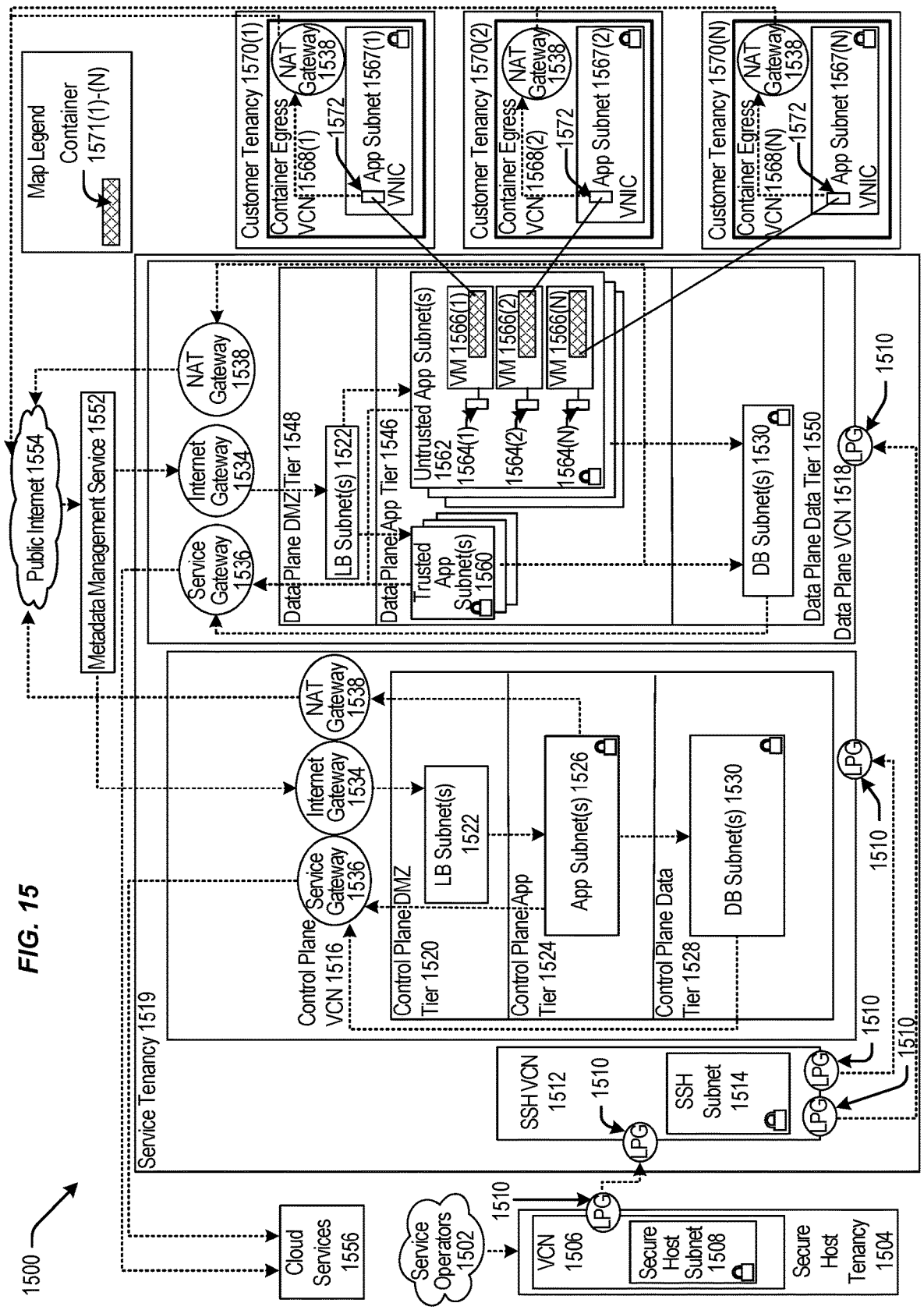
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1302 of FIG. 13) can be communicatively coupled to a secure host tenancy 1504 (e.g., the secure host tenancy 1304 of FIG. 13) that can include a virtual cloud network (VCN) 1506 (e.g., the VCN 1306 of FIG. 13) and a secure host subnet 1508 (e.g., the secure host subnet 1308 of FIG. 13). The VCN 1506 can include an LPG 1510 (e.g., the LPG 1310 of FIG. 13) that can be communicatively coupled to an SSH VCN 1512 (e.g., the SSH VCN 1312 of FIG. 13) via an LPG 1510 contained in the SSH VCN 1512. The SSH VCN 1512 can include an SSH subnet 1514 (e.g., the SSH subnet 1314 of FIG. 13), and the SSH VCN 1512 can be communicatively coupled to a control plane VCN 1516 (e.g., the control plane VCN 1316 of FIG. 13) via an LPG 1510 contained in the control plane VCN 1516 and to a data plane VCN 1518 (e.g., the data plane 1318 of FIG. 13) via an LPG 1510 contained in the data plane VCN 1518. The control plane VCN 1516 and the data plane VCN 1518 can be contained in a service tenancy 1519 (e.g., the service tenancy 1319 of FIG. 13).

The control plane VCN 1516 can include a control plane DMZ tier 1520 (e.g., the control plane DMZ tier 1320 of FIG. 13) that can include load balancer (LB) subnet(s) 1522 (e.g., LB subnet(s) 1322 of FIG. 13), a control plane app tier 1524 (e.g., the control plane app tier 1324 of FIG. 13) that can include app subnet(s) 1526 (e.g., similar to app subnet(s) 1326 of FIG. 13), a control plane data tier 1528 (e.g., the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 13) and a network address translation (NAT) gateway 1538 (e.g., the NAT gateway 1338 of FIG. 13). The control plane VCN 1516 can include the service gateway 1536 and the NAT gateway 1538.

The data plane VCN 1518 can include a data plane app tier 1546 (e.g., the data plane app tier 1346 of FIG. 13), a data plane DMZ tier 1548 (e.g., the data plane DMZ tier 1348 of FIG. 13), and a data plane data tier 1550 (e.g., the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g., public Internet 1354 of FIG. 13).

The Internet gateway 1534 contained in the control plane VCN 1516 and contained in the data plane VCN 1518 can be communicatively coupled to a metadata management service 1552 (e.g., the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
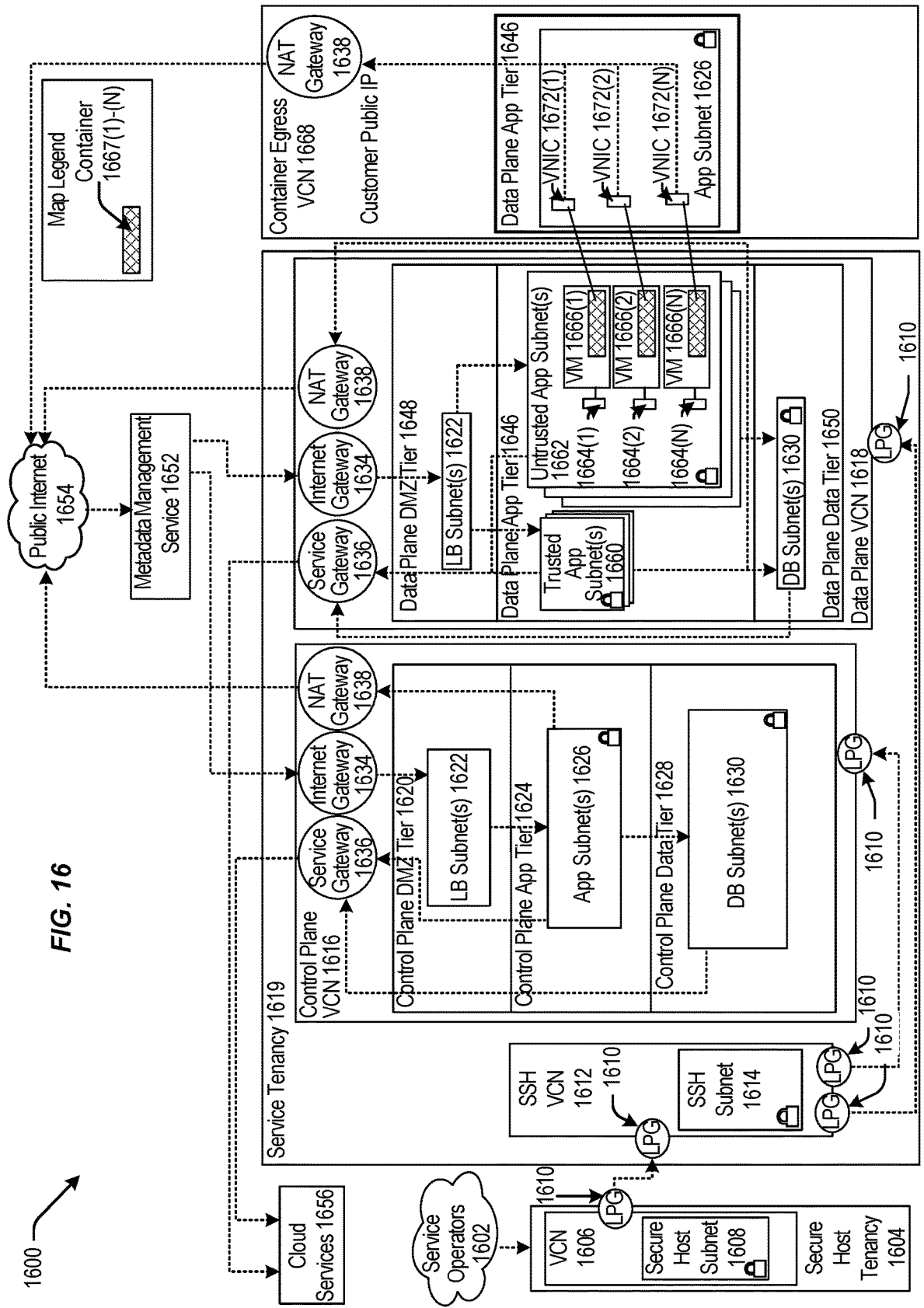
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1302 of FIG. 13) can be communicatively coupled to a secure host tenancy 1604 (e.g., the secure host tenancy 1304 of FIG. 13) that can include a virtual cloud network (VCN) 1606 (e.g., the VCN 1306 of FIG. 13) and a secure host subnet 1608 (e.g., the secure host subnet 1308 of FIG. 13). The VCN 1606 can include an LPG 1610 (e.g., the LPG 1310 of FIG. 13) that can be communicatively coupled to an SSH VCN 1612 (e.g., the SSH VCN 1312 of FIG. 13) via an LPG 1610 contained in the SSH VCN 1612. The SSH VCN 1612 can include an SSH subnet 1614 (e.g., the SSH subnet 1314 of FIG. 13), and the SSH VCN 1612 can be communicatively coupled to a control plane VCN 1616 (e.g., the control plane VCN 1316 of FIG. 13) via an LPG 1610 contained in the control plane VCN 1616 and to a data plane VCN 1618 (e.g., the data plane 1318 of FIG. 13) via an LPG 1610 contained in the data plane VCN 1618. The control plane VCN 1616 and the data plane VCN 1618 can be contained in a service tenancy 1619 (e.g., the service tenancy 1319 of FIG. 13).

The control plane VCN 1616 can include a control plane DMZ tier 1620 (e.g., the control plane DMZ tier 1320 of FIG. 13) that can include LB subnet(s) 1622 (e.g., LB subnet(s) 1322 of FIG. 13), a control plane app tier 1624 (e.g., the control plane app tier 1324 of FIG. 13) that can include app subnet(s) 1626 (e.g., app subnet(s) 1326 of FIG. 13), a control plane data tier 1628 (e.g., the control plane data tier 1328 of FIG. 13) that can include DB subnet(s) 1630 (e.g., DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 13) and a network address translation (NAT) gateway 1638 (e.g., the NAT gateway 1338 of FIG. 13). The control plane VCN 1616 can include the service gateway 1636 and the NAT gateway 1638.

The data plane VCN 1618 can include a data plane app tier 1646 (e.g., the data plane app tier 1346 of FIG. 13), a data plane DMZ tier 1648 (e.g., the data plane DMZ tier 1348 of FIG. 13), and a data plane data tier 1650 (e.g., the data plane data tier 1350 of FIG. 13). The data plane DMZ tier 1648 can include LB subnet(s) 1622 that can be communicatively coupled to trusted app subnet(s) 1660 (e.g., trusted app subnet(s) 1560 of FIG. 15) and untrusted app subnet(s) 1662 (e.g., untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane datatier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g., public Internet 1354 of FIG. 13).

The Internet gateway 1634 contained in the control plane VCN 1616 and contained in the data plane VCN 1618 can be communicatively coupled to a metadata management service 1652 (e.g., the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
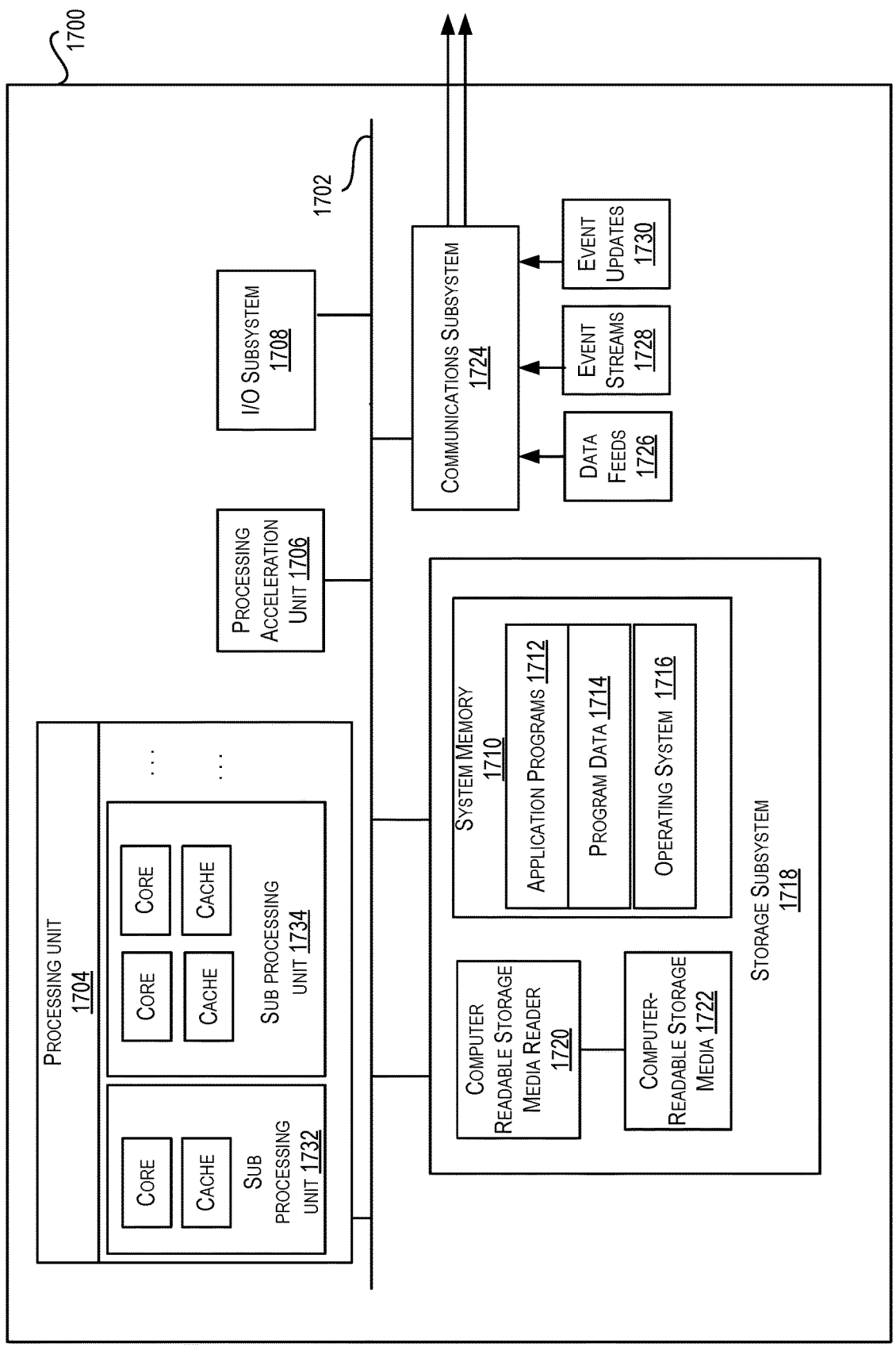
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that provides a tangible non-transitory computer-readable storage medium for storing software and data constructs that provide the functionality of the embodiments described in this disclosure. The software can include programs, code, instructions, scripts, etc., that when executed by one or more cores or processors of processing unit 1704 provide the functionality described above. Storage subsystem 1718 may also provide a repository for storing data used in accordance with the present disclosure.

As depicted in the example in FIG. 17, storage subsystem 1718 can include various components including a system memory 1710, computer-readable storage media 1722, and a computer readable storage media reader 1720. System memory 1710 may store program instructions that are loadable and executable by processing unit 1704. System memory 1710 may also store data that is used during the execution of the instructions and/or data that is generated during the execution of the program instructions. Various different kinds of programs may be loaded into system memory 1710 including but not limited to client applications, Web browsers, mid-tier applications, relational database management systems (RDBMS), virtual machines, containers, etc.

System memory 1710 may also store an operating system 1716. Examples of operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1700 executes one or more virtual machines, the virtual machines along with their guest operating systems (GOSs) may be loaded into system memory 1710 and executed by one or more processors or cores of processing unit 1704.

System memory 1710 can come in different configurations depending upon the type of computer system 1700. For example, system memory 1710 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 1710 may include a basic input/output system (BIOS) containing basic routines that help to transfer information between elements within computer system 1700, such as during start-up.

Computer-readable storage media 1722 may represent remote, local, fixed, and/or removable storage devices plus storage media for temporarily and/or more permanently containing, storing, computer-readable information for use by computer system 1700 including instructions executable by processing unit 1704 of computer system 1700.

Computer-readable storage media 1722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1700.

Machine-readable instructions executable by one or more processors or cores of processing unit 1704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   configuring, by a manager service, computing devices of a first data center for transmission by:
      implementing, by the manager service of a second data center, a seed server at a computing device of the computing devices, the seed server comprising a virtual bootstrap environment; and
      implementing, by the manager service, a software resource repository at the seed server, the software resource repository comprising software resources associated with cloud services executed on the computing devices; and
   during transmission of the computing devices to a target site, deploying, by the seed server and using the virtual bootstrap environment, a portion of the software resources associated with the cloud services to the computing devices.

2. The method of claim 1, further comprising:
during transmission of the computing devices to the target site:
    establishing a network connection between the computing devices and the manager service of the second data center;
    receiving, by the seed server from the manager service, an updated software resource; and
    storing the updated software resource in the software resource repository.

3. The method of claim 2, further comprising deploying the updated software resource to the computing devices.

4. The method of claim 1, further comprising:
during transmission of the computing devices to the target site:
    establishing a network connection between the computing devices and the manager service of the second data center; and
    deploying, by the manager service, an updated software resource to the computing devices.

5. The method of claim 1, wherein deploying the portion of the software resources comprises deploying an instance of a cloud service to the computing devices.

6. The method of claim 1, further comprising:
determining, by the seed server, that a deployment duration corresponding to the deployment of the software resources will exceed a transmission duration; and
prior to completion of the transmission of the computing devices and based at least on the determination that the deployment duration will exceed the transmission duration, configuring, by the seed server, the computing devices to resume deployment of the software resources after the computing devices are installed at the target site by storing a status information for the deployment of the portion of the software resources.

7. The method of claim 6, further comprising:
determining, by the seed server using the stored status information, a second portion of the software resources; and
deploying, by the seed server and after the computing devices are installed at the target site, a second portion of the software resources from the software resource repository.

8. The method of claim 6, further comprising:
after the computing devices are installed at the target site, establishing a network connection between the computing devices and the second data center;
sending, by the seed server to the manager service, the stored status information; and
deploying, by the manager service using the status information, additional software resources to the computing devices.

9. A system, comprising:
a containment enclosure configured to mount physical computing resources of a data center;
a networking device of the physical computing resources positionable in the containment enclosure;
a power supply positionable in the containment enclosure and electrically connected to the networking device; and
a plurality of computing devices of the physical computing resources positionable in the containment enclosure, communicatively connected to the networking device, and electrically connected to the power supply, a seed server device of the plurality of computing devices configured to host a virtual bootstrap environment and to deploy software resources to the plurality of computing devices using the virtual bootstrap environment during a transmission operation of the containment enclosure.

10. The system of claim 9, further comprising a cooling system connected to the containment enclosure and configured to maintain an ambient operating temperature of the containment enclosure during the transmission operation.

11. The system of claim 9, further comprising a networking fabric having a set of networking cables and characterized by a static network fabric topology, the set of networking cables configured to terminate at a location of the plurality of computing devices positioned in the containment enclosure, the plurality of computing devices configured to form a region network when communicatively connected to the set of networking cables according to a connection plan.

12. The system of claim 11, further comprising a cable terminal protection apparatus comprising:
    a frame positionable at the location of the plurality of computing devices; and
    a plurality of ports arranged on a face of the frame, each of the plurality of ports configured to accept a cable termination connector corresponding to a networking cable of the networking fabric.

13. The system of claim 9, wherein the containment enclosure comprises a shipping container configured to be transported by a truck during the transmission operation.

14. The system of claim 9, wherein the containment enclosure comprises a portion of an aircraft chassis.

15. A computing system, comprising:
one or more processors; and
one or more memories storing computer-readable instructions that, when executed by the one or more processors, cause the computing system to:
    configure computing devices of a first data center for transmission by:
        implementing a seed server at a computing device of the computing devices, the seed server comprising a virtual bootstrap environment; and
        implementing a software resource repository at the seed server, the software resource repository comprising software resources associated with cloud services executed on the computing devices; and
    during transmission of the computing devices to a target site, deploy a portion of the software resources associated with the cloud services to the computing devices using the virtual bootstrap environment of the seed server.

16. The computing system of claim 15, wherein the one or more memories store additional instructions that, when executed by the one or more processors, cause the computing system to further:
during transmission of the computing devices to the target site:
    establish a network connection between the computing devices and a manager service;
    receive, from the manager service, an updated software resource; and
    store the updated software resource in the software resource repository.

17. The computing system of claim 16, wherein the one or more memories store additional instructions that, when executed by the one or more processors, cause the computing system to further deploy the updated software resource to the computing devices.

18. The computing system of claim 15, wherein the one or more memories store additional instructions that, when executed by the one or more processors, cause the computing system to further:
    during transmission of the computing devices to the target site:
        establish a network connection between the computing devices and a manager service; and
        deploy an updated software resource to the computing devices.

19. The computing system of claim 15, wherein the one or more memories store additional instructions that, when executed by the one or more processors, cause the computing system to further:
    determine that a deployment duration corresponding to the deployment of the software resources will exceed a transmission duration; and
    prior to completion of the transmission of the computing devices and based at least on the determination that the deployment duration will exceed the transmission duration, configure the computing devices to resume deployment of the software resources after the computing devices are installed at the target site by storing a status information for the deployment of the portion of the software resources.

20. The computing system of claim 15, wherein the one or more memories store additional instructions that, when executed by the one or more processors, cause the computing system to further:
    determine, using the stored status information, a second portion of the software resources; and
    deploy, after the computing devices are installed at the target site, a second portion of the software resources from the software resource repository.

\* \* \* \* \*